(12) United States Patent
Nam et al.

(10) Patent No.: US 12,349,153 B2
(45) Date of Patent: Jul. 1, 2025

(54) NON-CONSECUTIVE SLOT MONITORING CONFIGURATION FOR EARLY ACCESS

(71) Applicant: QUALCOMM Incorporated, San Diego, CA (US)

(72) Inventors: Wooseok Nam, San Diego, CA (US); Xiaoxia Zhang, San Diego, CA (US); Tao Luo, San Diego, CA (US); Jing Sun, San Diego, CA (US); Zhifei Fan, San Diego, CA (US); Qingjiang Tian, San Diego, CA (US); Ahmed Abdelaziz Ibrahim Abdelaziz Zewail, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 705 days.

(21) Appl. No.: 17/674,791

(22) Filed: Feb. 17, 2022

(65) Prior Publication Data

US 2022/0272675 A1 Aug. 25, 2022

Related U.S. Application Data

(60) Provisional application No. 63/183,983, filed on May 4, 2021, provisional application No. 63/152,062, filed on Feb. 22, 2021.

(51) Int. Cl.
  *H04W 72/23* (2023.01)
  *H04W 72/0446* (2023.01)
  *H04W 74/0833* (2024.01)

(52) U.S. Cl.
  CPC ....... *H04W 72/23* (2023.01); *H04W 72/0446* (2013.01); *H04W 74/0833* (2013.01)

(58) Field of Classification Search
  CPC ............ H04W 72/23; H04W 72/0446; H04W 74/0833; H04W 72/02; H04W 72/1263
  See application file for complete search history.

(56) References Cited

U.S. PATENT DOCUMENTS

2020/0314747 A1 10/2020 Zhou et al.
2020/0389847 A1* 12/2020 Deng ................ H04W 52/0219
(Continued)

OTHER PUBLICATIONS

International Search Report and Written Opinion—PCT/US2022/017020—ISA/EPO—May 30, 2022.
(Continued)

*Primary Examiner* — Gary Mui
*Assistant Examiner* — Yewon Kim
(74) *Attorney, Agent, or Firm* — Kevin M. Donnelly; Seyfarth Shaw LLP

(57) ABSTRACT

A method for wireless communication performed by a user equipment (UE) includes receiving, from a network node, a message indicating a set of multi-slot monitoring configurations supported by a base station based on a minimum monitoring occasion periodicity associated with a search space being greater than or equal to one slot. The method also includes transmitting, to the network node, a selection message indicating selection of a single multi-slot monitoring configuration from the set of multi-slot monitoring configurations. The method still further includes monitoring the search space for a physical downlink control channel (PDCCH) transmission in a plurality of non-consecutive monitoring occasion groups, each monitoring occasion group comprising a plurality of non-consecutive monitoring occasions based on the single multi-slot monitoring configuration.

22 Claims, 13 Drawing Sheets

(56) References Cited

U.S. PATENT DOCUMENTS

| | | | | |
|---|---|---|---|---|
| 2021/0352501 | A1* | 11/2021 | Taherzadeh Boroujeni | ................ H04W 72/23 |
| 2022/0345920 | A1* | 10/2022 | Liu | ....................... H04W 24/08 |
| 2023/0232416 | A1* | 7/2023 | Wang | .................. H04W 72/232 370/329 |
| 2023/0379938 | A1* | 11/2023 | Li | ....................... H04W 72/232 |
| 2024/0314689 | A1* | 9/2024 | Agiwal | ............. H04W 72/0453 |

OTHER PUBLICATIONS

Samsung: "Extended PO for Paging in NR-U", 3GPP TSG-RAN2 105bis, R2-1903106, 3GPP, Mobile Competence Centre, 650, Route Des Lucioles, F-06921, Sophia-Antipolis Cedex, France, vol. RAN WG2, No. Xian, China, Apr. 8, 2019-Apr. 12, 2019, Apr. 6, 2019, XP051700460, 4 Pages, URL: http://www.3gpp.org/ftp/Meetings%5F3GPP%5FSYNC/RAN2/Docs/R2%2D1903106%2Ezip [retrieved on Apr. 6, 2019] Proposals 1-3, page second, figures 1-2.

* cited by examiner

NON-CONSECUTIVE SLOT MONITORING CONFIGURATION FOR EARLY ACCESS

CROSS-REFERENCE TO RELATED APPLICATIONS

The present application claims the benefit of U.S. Provisional Patent Application No. 63/152,062, filed on Feb. 22, 2021, and titled "NON-CONSECUTIVE SLOT MONITORING CONFIGURATION FOR EARLY ACCESS," and U.S. Provisional Patent Application No. 63/183,983, filed on May 4, 2021, and titled "NON-CONSECUTIVE SLOT MONITORING CONFIGURATION FOR EARLY ACCESS," the disclosure of which are expressly incorporated by reference in their entireties.

FIELD OF THE DISCLOSURE

Aspects of the present disclosure generally relate to wireless communication, and specifically, to techniques and apparatuses for monitoring non-consecutive slots for early access.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

In some examples, a UE may be configured to monitor for a downlink transmission, such as control information transmitted on a physical downlink control channel (PDCCH), in one or more monitoring occasions within each slot of a subframe. In some such examples, an amount of time for receiving, decoding, and processing the downlink transmission may be less than a duration of one slot. Therefore, to conserve power, the UE may enter a micro-sleep state for a remaining duration of a slot after receiving, decoding, and processing the downlink transmission received in the slot.

SUMMARY

The systems, methods, and devices of this disclosure each have several innovative aspects, no single one of which is solely responsible for the desirable attributes disclosed herein.

In one aspect of the present disclosure, a method for wireless communication performed by a user equipment (UE) includes receiving, from a network node, a message indicating a set of multi-slot monitoring configurations supported by the network node based on a minimum monitoring occasion periodicity associated with a search space being greater than or equal to one slot. The method further includes transmitting, to the network node, a selection message indicating selection of a single multi-slot monitoring configuration from the set of multi-slot monitoring configurations. The method still further includes monitoring the search space for a physical downlink control channel (PDCCH) transmission in a number of non-consecutive monitoring occasion groups. Each monitoring occasion group of the number of non-consecutive monitoring occasion groups may include a number of non-consecutive monitoring occasions associated with the single multi-slot monitoring configuration.

Another aspect of the present disclosure is directed to an apparatus including means for receiving, from a network node, a message indicating a set of multi-slot monitoring configurations supported by the network node based on a minimum monitoring occasion periodicity associated with a search space being greater than or equal to one slot. The apparatus further includes means for transmitting, to the network node, a selection message indicating selection of a single multi-slot monitoring configuration from the set of multi-slot monitoring configurations. The apparatus still further includes means for monitoring the search space for a PDCCH transmission in a number of non-consecutive monitoring occasion groups. Each monitoring occasion group of the number of non-consecutive monitoring occasion groups may include a number of non-consecutive monitoring occasions associated with the single multi-slot monitoring configuration.

In another aspect of the present disclosure, a non-transitory computer-readable medium with non-transitory program code recorded thereon is disclosed. The program code is executed by a processor and includes program code to receive, from a network node, a message indicating a set of multi-slot monitoring configurations supported by the network node based on a minimum monitoring occasion periodicity associated with a search space being greater than or equal to one slot. The program code further includes program code to transmit, to the network node, a selection message indicating selection of a single multi-slot monitoring configuration from the set of multi-slot monitoring configurations. The program code still further includes program code to monitor the search space for a PDCCH transmission in a number of non-consecutive monitoring occasion groups. Each monitoring occasion group of the number of non-consecutive monitoring occasion groups may include a number of non-consecutive monitoring occasions associated with the single multi-slot monitoring configuration.

In one aspect of the present disclosure, a method for wireless communication performed by a network node includes transmitting a message indicating a set multi-slot monitoring configurations supported by the network node based on a minimum monitoring occasion periodicity associated with a search space being greater than or equal to one slot. The method further includes receiving a selection message indicating a single multi-slot monitoring configuration from the set multi-slot monitoring configurations. The single multi-slot monitoring configuration may be associated with a monitoring occasion periodicity for each monitoring occasion group of a number of non-consecutive monitoring occasion groups. Additionally, each monitoring occasion group may include a number of non-consecutive monitoring occasions. The method still further includes transmitting control information on a PDCCH in the search space based on receiving the selection message. The control information may be transmitted according to the single multi-slot monitoring configuration.

Another aspect of the present disclosure is directed to an apparatus for wireless communications at a UE. The apparatus includes a processor and a memory coupled with the processor and storing instructions operable, when executed by the processor, to cause the apparatus to receive, from a network node, a message indicating a set of multi-slot monitoring configurations supported by the network node based on a minimum monitoring occasion periodicity associated with a search space being greater than or equal to one slot. Execution of the instructions further cause the apparatus to transmit, to the network node, a selection message indicating selection of a single multi-slot monitoring configuration from the set of multi-slot monitoring configurations. Execution of the instructions also cause the apparatus to monitor the search space for a PDCCH transmission in a number of non-consecutive monitoring occasion groups. Each monitoring occasion group of the number of non-consecutive monitoring occasion groups may include a number of non-consecutive monitoring occasions associated with the single multi-slot monitoring configuration.

Another aspect of the present disclosure is directed to an apparatus including means for transmitting a message indicating a set multi-slot monitoring configurations supported by the network node based on a minimum monitoring occasion periodicity associated with a search space being greater than or equal to one slot. The apparatus further includes means for receiving a selection message indicating a single multi-slot monitoring configuration from the set multi-slot monitoring configurations. The single multi-slot monitoring configuration may be associated with a monitoring occasion periodicity for each monitoring occasion group of a number of non-consecutive monitoring occasion groups. Additionally, each monitoring occasion group may include a number of non-consecutive monitoring occasions. The apparatus still further includes means for transmitting control information on a PDCCH in the search space based on receiving the selection message. The control information may be transmitted according to the single multi-slot monitoring configuration.

In another aspect of the present disclosure, a non-transitory computer-readable medium with non-transitory program code recorded thereon is disclosed. The program code is executed by a processor and includes program code to transmit a message indicating a set multi-slot monitoring configurations supported by the network node based on a minimum monitoring occasion periodicity associated with a search space being greater than or equal to one slot. The program code further includes program code to receive a selection message indicating a single multi-slot monitoring configuration from the set multi-slot monitoring configurations. The single multi-slot monitoring configuration may be associated with a monitoring occasion periodicity for each monitoring occasion group of a number of non-consecutive monitoring occasion groups. Additionally, each monitoring occasion group may include a number of non-consecutive monitoring occasions. The program code still further includes program code to transmit control information on a PDCCH in the search space based on receiving the selection message. The control information may be transmitted according to the single multi-slot monitoring configuration.

Another aspect of the present disclosure is directed to an apparatus for wireless communications at a network node. The apparatus includes a processor and a memory coupled with the processor and storing instructions operable, when executed by the processor, to cause the apparatus to transmit a message indicating a set multi-slot monitoring configurations supported by the network node based on a minimum monitoring occasion periodicity associated with a search space being greater than or equal to one slot. The processor(s) is further configured to receive a selection message indicating a single multi-slot monitoring configuration from the set multi-slot monitoring configurations. The single multi-slot monitoring configuration may be associated with a monitoring occasion periodicity for each monitoring occasion group of a number of non-consecutive monitoring occasion groups. Additionally, each monitoring occasion group may include a number of non-consecutive monitoring occasions. The processor(s) is still further configured to transmit control information on a PDCCH in the search space based on receiving the selection message. The control information may be transmitted according to the single multi-slot monitoring configuration.

Another aspect of the present disclosure is directed to an apparatus for wireless communications at a UE. The apparatus includes a processor and a memory coupled with the processor and storing instructions operable, when executed by the processor, to cause the apparatus to receive, from a network node, a message indicating a set of multi-slot monitoring configurations supported by the network node based on a minimum monitoring occasion periodicity associated with a search space being greater than or equal to one slot. Execution of the instructions further cause the apparatus to transmit, to the network node, a selection message indicating selection of a single multi-slot monitoring configuration from the set of multi-slot monitoring configurations. Execution of the instructions also cause the apparatus to monitor the search space for a PDCCH transmission in a number of non-consecutive monitoring occasion groups. Each monitoring occasion group of the number of non-consecutive monitoring occasion groups may include a number of non-consecutive monitoring occasions associated with the single multi-slot monitoring configuration.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying Figures. Each of the Figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
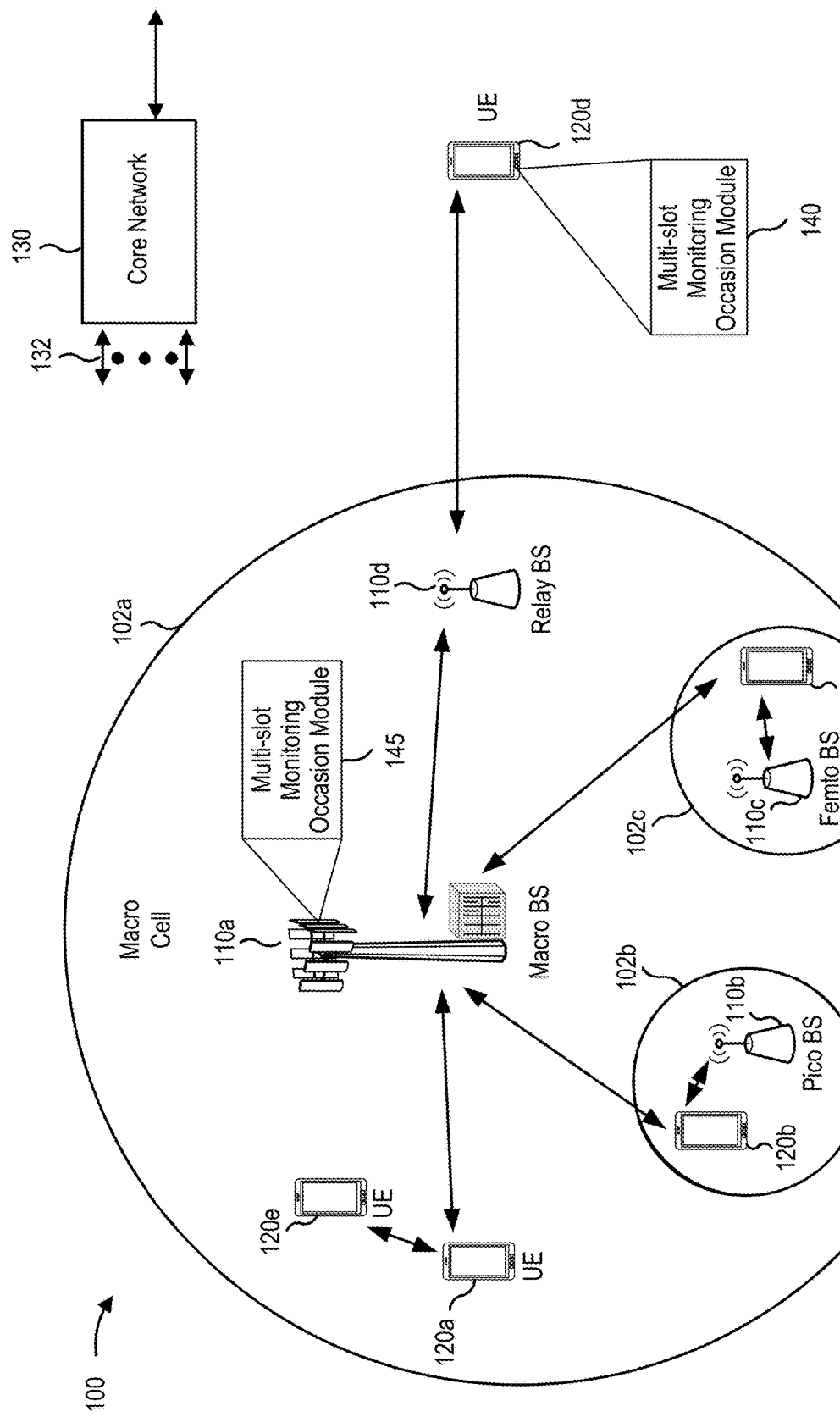
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and 4G technologies.

As described, in conventional systems, a user equipment (UE) may receive, decode, and process control information during a slot of a subframe. In some examples, the control information includes scheduling information indicating that a data transmission is not scheduled in the remainder of the slot. In some such examples, because the data transmission is not scheduled for the remainder of the slot, the UE may enter a micro-sleep state for the remaining time period of the slot to conserve power. In other examples, a length of a slot may decrease as a result of an increase in subcarrier spacing (SCS). In some such examples, the base station may configure monitoring occasions in consecutive slots. In such examples, the UE may not have sufficient time to receive, process, and decode the control information during initial access because an amount of time for receiving, decoding, and processing the downlink transmission may be greater than, or equal to, one slot. Because the UE may not have sufficient time to receive, process, and decode the control information, the UE may fail to enter a sleep state in one or more slots of the consecutive slots, thereby increasing the UE's power consumption. Additionally, the UE may fail to monitor all of the monitoring occasions in consecutive slots, which may increase latency and reduce communication quality.

Aspects of the present disclosure generally relate to wireless communication, and specifically to techniques and apparatuses for selecting a multi-slot monitoring configuration, based on a monitoring capability of the UE, prior to, or during, an initial access period, such as a random access period. The multi-slot monitoring configuration may identify a periodicity for a set of non-consecutive monitoring occasions, where each slot of a set of consecutive slots in the initial access period may include one or more non-consecutive monitoring occasions from the set of non-consecutive monitoring occasions. The set of consecutive slots may be associated with one monitoring occasion group of a set of non-consecutive monitoring occasion groups, where each monitoring occasion group may be associated with a different set of consecutive slots. In various examples, a UE receives, from a base station, a message indicating a set of multi-slot monitoring configurations supported by the base station. The indication may be an implicit indication or an explicit indication. In some examples, the message may be received via, for example, system information or radio resource control (RRC) signaling. In such examples, the UE may select a multi-slot monitoring configuration from the set of multi-slot monitoring configurations based on a monitoring capability of the UE. The UE may then transmit, to the base station, an indicator identifying the selected multi-slot monitoring configuration (for example, first multi-slot monitoring configuration). Furthermore, the UE may monitor a search space for a physical downlink control channel (PDCCH) in a set of non-consecutive monitoring occasions according to the selected multi-slot monitoring configuration.

Particular aspects of the subject matter described in this disclosure may be implemented to realize one or more of the following potential advantages. In some examples, by receiving an indication of the selected multi-slot monitoring configuration from a UE, a base station may configure downlink control channel transmissions in non-consecutive monitoring occasions within one or more consecutive slots to provide sufficient time for the UE to receive, process, and decode control information during an initial access period. By providing the UE with sufficient time to receive, process, and decode the control information during the initial access, various aspects of the present may reduce UE power consumption, reduce latency, and improve communication reliability, among other advantages. In some examples, the UE may enter a micro-sleep state between the non-consecutive monitoring occasions, thereby reducing UE power consumption.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an example of a network entity that communicates with user equipment (UEs) and may also be referred to as a base station, an NR BS, a Node B, a gNB, a 5G node B (NB), an access point, a transmit and receive point (TRP), and the like. Each BS may provide communications coverage for a particular geographic area. In 3GPP, the term "cell" can refer to a coverage area of a BS and a BS subsystem serving this coverage area, depending on the context in which the term is used.

A BS may provide communications coverage for a macro cell, a pico cell, a femto cell, and another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and to one or more other BSs or network nodes (not shown) in the wireless network 100 through various types of backhaul interfaces such as a direct physical connection, a virtual network, and the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and the like.

The wireless network 100 may be a heterogeneous network that includes BSs of different types, e.g., macro BSs, pico BSs, femto BSs, relay BSs, and the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless communications system 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a multi-slot monitoring occasion module 140. For brevity, only one UE 120d is shown as including the multi-slot monitoring occasion module 140. The multi-slot monitoring occasion module 140 may determine a set of multi-slot monitoring configurations supported by a base station 110 from an implicit indication or explicit indication based on a minimum monitoring occasion periodicity of the UE 120 in a common search space (CSS) being greater than one slot. The multi-slot monitoring occasion module 140 may also select a first multi-slot monitoring configuration from the set of multi-slot monitoring configurations. The multi-slot monitoring occasion module 140 may further cause the UE 120 to transmit, to the base station 110, a first indicator identifying the first multi-slot monitoring configuration. The multi-slot monitoring occasion module 140 may still further cause the UE 120 to monitor the CSS for a PDCCH in a set of non-consecutive monitoring occasions based on the first multi-slot monitoring configuration.

The base stations 110 may include a multi-slot monitoring occasion module 145. For brevity, only one base station 110a is shown as including the multi-slot monitoring occasion module 145. The multi-slot monitoring occasion module 145 may receive, from a UE 120, a first indicator identifying a first multi-slot monitoring configuration selected from a set of multi-slot monitoring configurations supported by the base station based on a minimum monitoring occasion periodicity of the UE 120 in a CSS being greater than one slot. The first multi-slot monitoring configuration identifies a periodicity for monitoring occasions of a set of non-consecutive monitoring occasions. The multi-slot monitoring occasion module 145 may also cause the base station 110 to transmit to the UE 120, control information on a PDCCH in the CSS based on the first multi-slot monitoring configuration.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and may be implemented as NB-IoT (narrowband internet of things) devices. Some UEs may be considered a customer premises equipment (CPE). UE 120 may be included inside a housing that houses components of UE 120, such as processor components, memory components, and the like.

In general, any number of wireless networks may be deployed in a given geographic area. Each wireless network may support a particular radio access technology (RAT) and may operate on one or more frequencies. A RAT may also be referred to as a radio technology, an air interface, and the like. A frequency may also be referred to as a carrier, a frequency channel, and the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and the like), a mesh network, and the like. In this case, the UE 120 may perform scheduling operations, resource selection operations, and other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
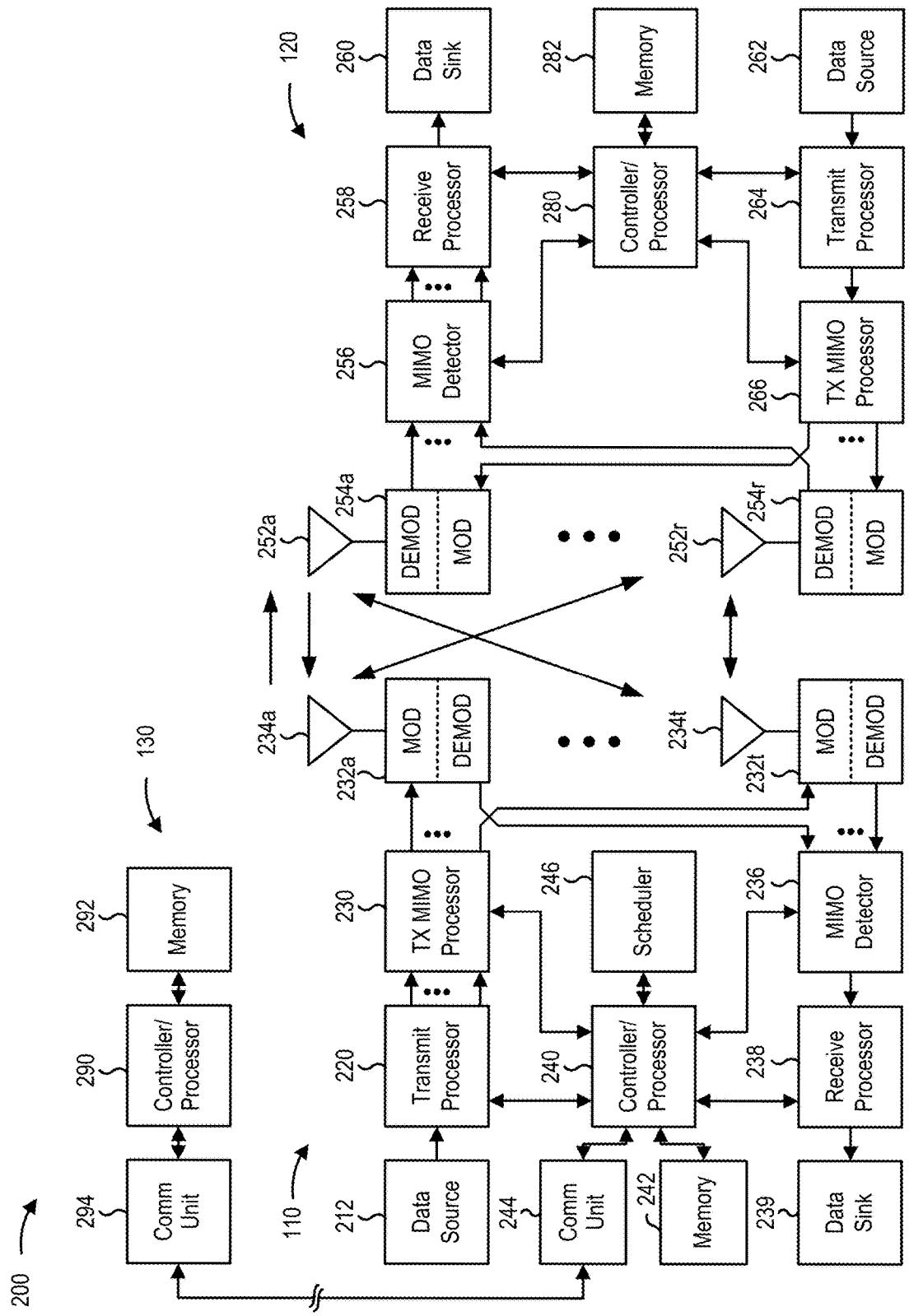
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and the like) and control information (e.g., CQI requests, grants, upper layer signaling, and the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and the reference symbols, if applicable, and may provide T output symbol streams to T modulators (MODs) 232a through 232t. Each modulator 232 may process a respective output symbol stream (e.g., for OFDM and the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and other base stations and may provide received signals to demodulators (DEMODs) 254a through 254r, respectively. Each demodulator 254 may condition (e.g., filter, amplify, down-convert, and digitize) a received signal to obtain input samples. Each demodulator 254 may further process the input samples (e.g., for OFDM and the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and any other component(s) of FIG. 2 may perform one or more techniques associated with identifying a multi-slot monitoring occasion configuration, as described in more detail elsewhere. For example, the controller/processor 240 of the base station 110, the controller/processor 280 of the UE 120, and any other component(s) of FIG. 2 may perform or direct operations of, for example, the processes of FIGS. 9 and 11 and other processes as described. Memories 242 and 282 may store data and program codes for the base station 110 and UE 120, respectively. A scheduler 246 may schedule UEs for data transmission on the downlink and uplink.

Figure 3:
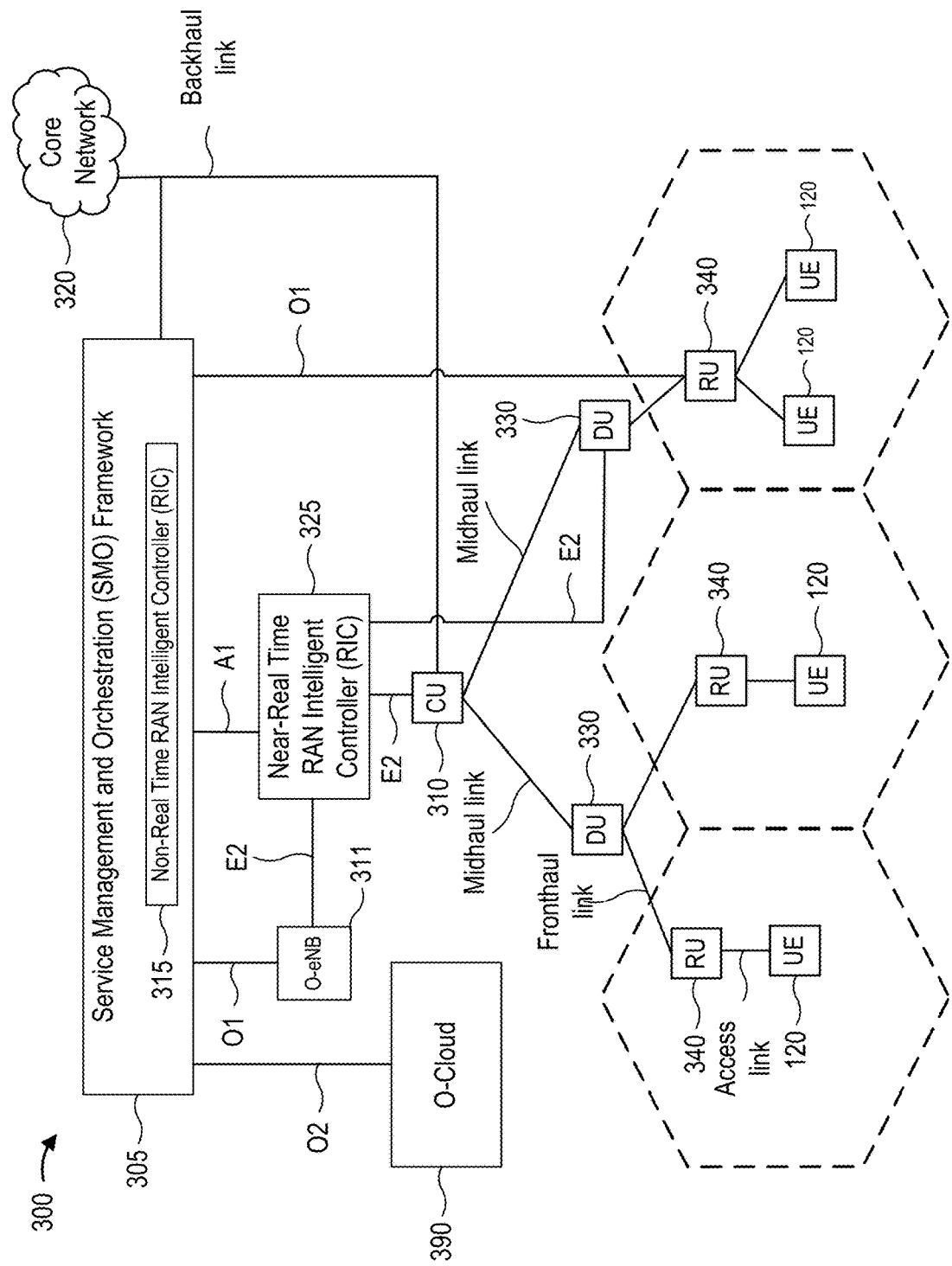
FIG. 3 is a diagram illustrating an example disaggregated base station architecture.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 440 and Near-RT RICs 325. In some implementations, the SMO Framework 305 can communicate with a hardware aspect of a 4G RAN, such as an open eNB (O-eNB) X11, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an AI interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as AI policies).

As previously discussed, in conventional systems, a UE may receive, decode, and process control information during a slot of a subframe. In some examples, the control information includes scheduling information indicating that a data transmission is not scheduled in the remainder of the slot. In some such examples, because the data transmission is not scheduled for the remainder of the slot, the UE may enter a micro-sleep state for the remaining time period of the slot to conserve power. In other examples, a length of a slot may decrease as a result of an increase in SCS. In some such examples, the base station may configure monitoring occasions in consecutive slots. In such examples, the UE may not have sufficient time to receive, process, and decode the control information during the initial access because an amount of time for receiving, decoding, and processing the downlink transmission may be greater than, or equal to, one slot. Because the UE may not have sufficient time to receive, process, and decode the control information, the UE may be fail to enter a sleep state between consecutive slots, thereby increasing the UE's power consumption. Additionally, the UE may be fail to monitor all of the monitoring occasions in consecutive slots, which may increase latency and reduce communication quality.

Aspects of the present disclosure generally relate to wireless communication, and specifically to techniques and apparatuses for selecting a multi-slot monitoring configuration, based on a monitoring capability of the UE, prior to, or during, an initial access period, such as a random access period. The multi-slot monitoring configuration may identify a periodicity for a set of non-consecutive monitoring occasions, where each monitoring occasion of the set of non-consecutive monitoring occasions is in a respective slot of a set of slots in the initial access period. In various examples, a UE receives, from a base station, a message indicating a set of multi-slot monitoring configurations supported by the base station. The indication may be an implicit indication or an explicit indication. In some examples, the message may be received via, for example, system information or RRC signaling. In such examples, the UE may select a multi-slot monitoring configuration from the set of multi-slot monitoring configurations based on a monitoring capability of the UE. The UE may then transmit, to the base station, an indicator identifying the selected multi-slot monitoring configuration. Furthermore, the UE may monitor a search space, such as a common search space (CSS) or a UE-specific search space (USS), for a PDCCH in a set of non-consecutive monitoring occasions according to the selected multi-slot monitoring configuration.

Figure 4A:
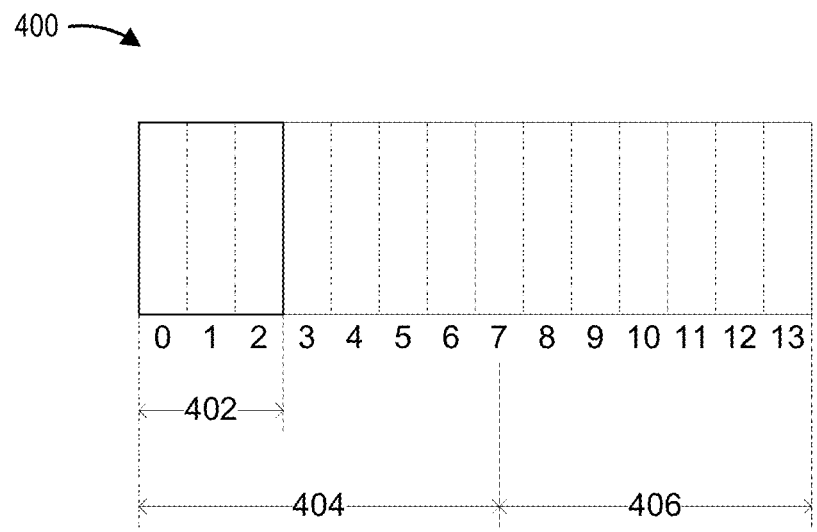
FIG. 4A is a block diagram illustrating an example of processing time within a slot, in accordance with the present disclosure.

FIG. 4A is a block diagram illustrating an example 400 of processing time within a slot, in accordance with the present disclosure. As shown in FIG. 4A, a base station 110 (not shown) may transmit control information, such as scheduling information, on a control channel, such as a PDCCH associated with a control resource set (CORESET), during a time period 402 within a slot. The slot may refer to a portion of a subframe, which may be a fraction of a radio frame within an LTE, 5G, or other wireless communication structure. In some aspects, a slot may include one or more symbols, such as OFDM symbols. In the example 400 of FIG. 4, the slot includes fourteen symbols.

Additionally, in the example of FIG. 4A, a UE 120 (not shown) may receive, decode, and process the control information during a time period 404. In some examples, the processed control information indicates that a data transmission, such as a physical downlink shared channel (PDSCH) transmission, is not scheduled in the remainder of the slot (for example, time period 406). Accordingly, during a time period 406, the UE 120 may enter a micro-sleep state to conserve power after determining the data transmission is not scheduled in the remainder of the time period 406. During the micro-sleep state, one or more components of the UE 120, such as antennas, demodulators, processors, or other hardware components, may temporarily power off or idle to reduce power consumption.

Generally, in multiplexing pattern 1, the UE 120 may monitor one monitoring occasion per slot in two or more consecutive slots. For example, the UE 120 may monitor, for control information associated with a SIB message, a set of monitoring occasions that includes monitoring occasions in consecutive slots. In multiplexing patterns 2 and 3, the UE 120 may monitor, for control information associated with a SIB message, a set of monitoring occasions that repeats with a periodicity equal to a periodicity of an associated synchronization signal block (SSB) within an SSB burst set. Because SSB periodicity within an SSB burst set is often short, the UE 120 generally monitors a set of monitoring occasions that includes monitoring occasions in consecutive slots. For other search spaces, such as Type0A PDCCH CSS associated with additional SIB messages, a Type1 PDCCH CSS associated with a random access response (RAR), or a Type2 PDCCH CSS associated with a paging occasion, a base station may instruct the UE 120 to monitor a similar set of monitoring occasions that includes monitoring occasions in consecutive slots. In some examples, the base station may instruct the UE 120 to monitor a similar set of monitoring occasions by setting one or more of a SearchSpaceId for searchSpaceOtherSystemInformation, ra-SearchSpace, or pagingSearchSpace in PDCCH-ConfigCommon, as defined in 3GPP specifications, to zero.

In some examples, phase noise may increase when higher frequencies, such as frequencies between 52.6 GHz and 114.25 GHz, are used for wireless communication between the UE 120 and the base station 110. For ease of explanation, the frequency range with a carrier frequency higher than 52.6 GHz may be referred to as a high frequency range or frequency range 4 (FR4). In some examples, phase noise experienced in FR4 may be greater in comparison to phase noise experienced in frequency range 2 (FR2). In some such examples, a wireless network may increase SCS to reduce the impact of phase noise. For example, FR2 may use between 60 kHz and 120 kHz SCS, while higher frequencies may use between 240 kHz and 1.92 MHz SCS. A duration of each slot of a subframe may decrease based on the increased SCS.

Figure 4B:
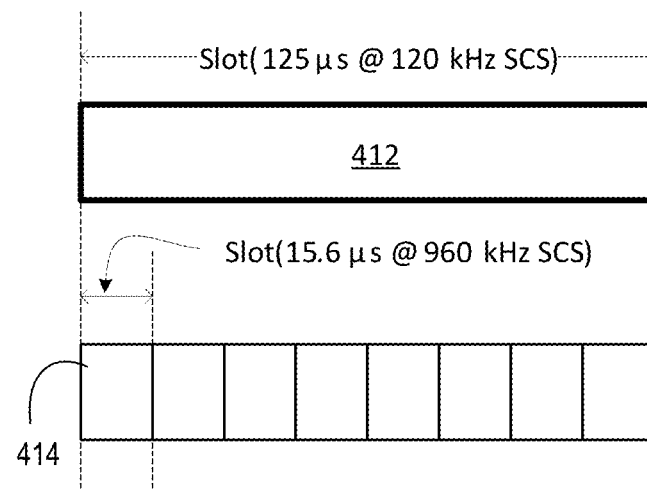
FIG. 4B is a block diagram illustrating an example of slot sizes, in accordance with aspects of the present disclosure.

FIG. 4B is a block diagram illustrating an example of slot sizes, in accordance with aspects of the present disclosure. As shown in the example of FIG. 4B, a slot 412 in FR2 with 120 kHz SCS may be approximately 125 μs in length. Additionally, as shown in FIG. 4B, a slot 414 in higher frequencies such as FR4, with 960 kHz SCS, may be approximately 15.6 μs in length. Accordingly, the FR2 slot 412 may be approximately eight times longer in comparison to the FR4 slot 404. Therefore, because the FR4 slot 414 is shorter in duration, an amount of time for receiving, decoding, and processing the downlink transmission may be greater than, or equal to, the duration of the FR4 slot 414. Therefore, in some examples, the UE 120 may be unable to enter a micro-sleep state, as described above in connection with FIG. 4A. In some such examples, the UE 120 may consume more power. In some examples, the longer SCS may result in the UE 120 using multiple slots to receive, decode, and process information from the base station. As a result, the UE 120 and the base station 110 may experience an increase in latency and a reduced communication quality because the UE 120 may be unable to monitor all configured monitoring occasions. In such examples, it may be desirable to configure monitoring occasions in two or more non-consecutive slots. That is, each monitoring occasion may be once every M-th slot, where M is greater than one. In contrast, the monitoring occasions of conventional systems may be in two or more consecutive slots. In the present disclosure, for ease of explanation, a multi-slot monitoring configuration may refer to configuring monitoring occasions in two or more non-consecutive slots.

In some examples, the multi-slot monitoring configuration may be applied for a UE search space (USS). In such examples, the UE 120 may indicate a multi-slot monitoring configuration during the connection establishment. The base station 110 may configure control channel transmissions in the USS based on the multi-slot monitoring configuration reported by the UE 120.

In some examples, the UE 120 and the base station 110 may experience an increase in latency and a reduction in communication reliability because the UE 120 may fail to monitor two or more consecutive monitoring occasions based on higher SCSs, such as 480 kHz SCS or 960 kHz SCS, applied to an initial BWP during one or both of an idle mode operation or initial network access. In some aspects, the multi-slot based monitoring configuration may be applied to a CSS to reduce latency and improve communication reliability during one or both of idle mode operations or initial network access. In some examples, prior to the initial access or the idle/inactive mode operation, a base station may be unaware of a capability of the UE 120 for supporting non-consecutive monitoring occasions. Therefore, it may be desirable for the UE 120 to provide an early indication of a supported multi-slot monitoring configuration to the base station. The supported multi-slot monitoring configuration may indicate the capability of the UE 120 for supporting non-consecutive monitoring occasions. The early indication may be an example of an indication transmitted prior to initial access or prior to the idle mode operation. Some aspects of the present disclosure are directed to the UE 120 providing an early indication of the UE's multi-slot monitoring configuration. Some other aspects of the present disclosure are directed to a CSS reconfiguration to support the UE's multi-slot monitoring configuration.

In some examples, for backward compatibility, the monitoring occasions (MOs) may be defined in two or more consecutive slots regardless of a length of the SCS. In such examples, the MOs may be in consecutive slots for monitoring one or more of a Type0 PDCCH CSS, a Type0A PDCCH CSS, a Type1 PDCCH CSS, or a Type2 PDCCH CSS during one or both of an idle mode operation or initial network access.

Figure 5:
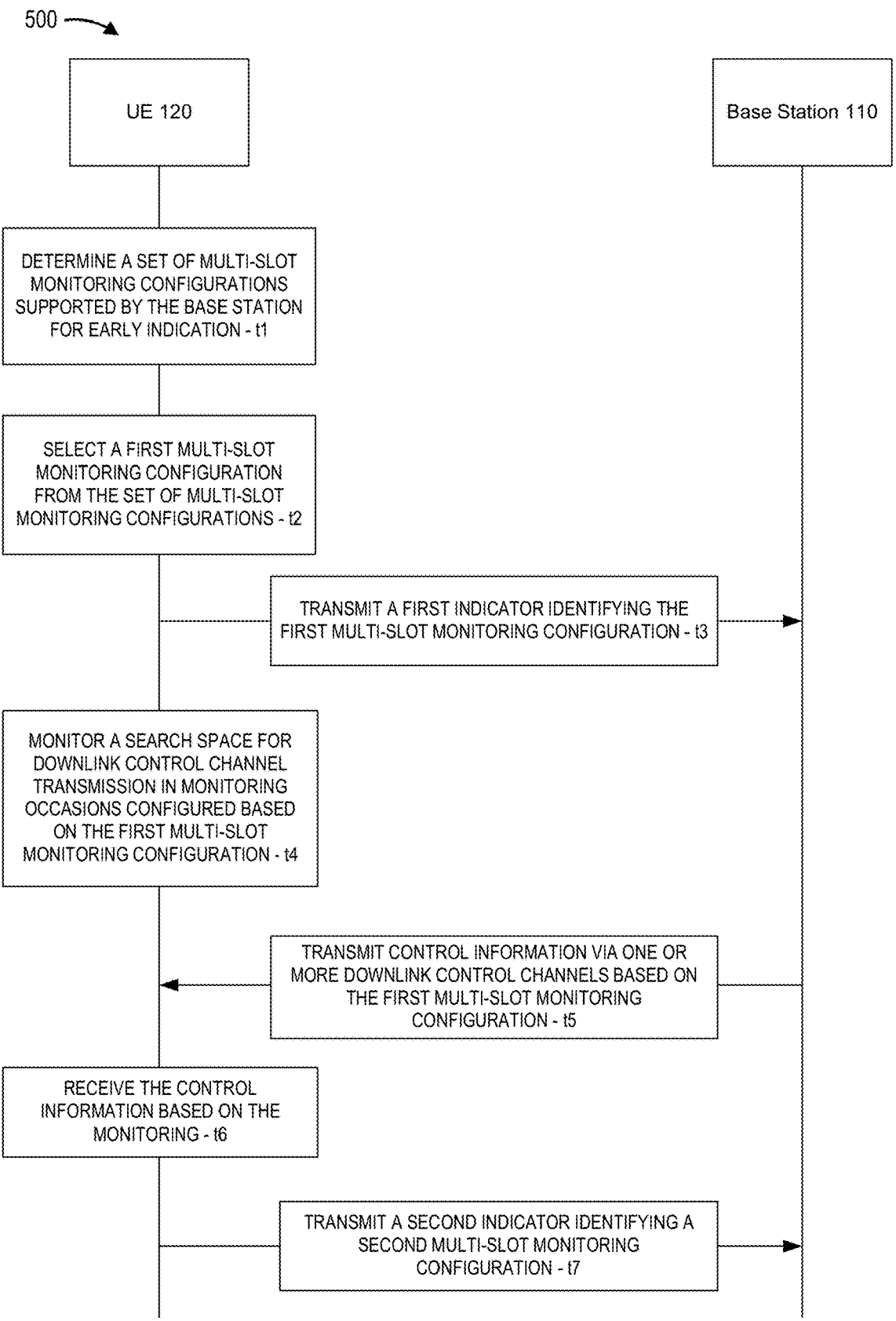
FIG. 5 is a timing diagram illustrating an example of a UE indicating a multi-slot monitoring configuration, in accordance with aspects of the present disclosure.

FIG. 5 is a timing diagram illustrating an example 500 of a UE indicating a multi-slot monitoring configuration, in accordance with aspects of the present disclosure. As shown in FIG. 5, at time t1, the UE 120 determines a set of multi-slot monitoring configurations supported by the base station for early indication. The set of multi-slot monitoring configurations may be determined based on an implicit indication or an explicit indication receive from the base station 110. The implicit indication may include one or more of a frequency band for wireless communication between the UE 120 and the base station 110 or SCS configured for wireless communication between the UE 120 and the base station 110, and the explicit indication may include a message received from the base station via system information, such as a SIB, or control signaling, such as RRC signaling. Additionally, or alternatively, the set of multi-slot monitoring configurations may pre-configured at the UE 120. Each multi-slot monitoring configuration may be associated with a different respective monitoring occasion periodicity for monitoring a PDCCH in a search space, such as a CSS. In some examples, based on 480 kHz SCS for an initial BWP, the set of multi-slot monitoring configurations may include a two-slot monitoring configuration (for example, M=2) or a four-slot monitoring configuration (for example, M=4). In some other examples, based on 960 kHz SCS for the initial BWP, the set of multi-slot monitoring configurations may include a four-slot monitoring configuration (for example, M=4) or an eight-slot monitoring configuration (for example, M=8). The set of multi-slot monitoring configurations may be indicated via a system information message, such as a SIB1 message, or RRC signaling, such as an RRC reconfiguration message or an RRC release message. The base station 110 may indicate the set of multi-slot monitoring configurations based on the UE's minimum monitoring periodicity being greater than one slot. As described, the UE's minimum monitoring periodicity may be greater than one slot when wireless communication between the UE 120 and the base station 110 is in FR4, such that the SCS may be higher (for example, the SCS may be 480 kHz or 960 kHz).

In the example of FIG. 5, at time t2, the UE 120 may select a multi-slot monitoring configuration from the set of multi-slot monitoring configurations determined at time t1. Additionally, as shown in FIG. 5, at time t3, the UE 120 may transmit an indicator (for example, first indicator) identifying the selected multi-slot monitoring configuration based on selecting the multi-slot monitoring configuration at time t2. In some aspects, the indicator may be transmitted during a random access procedure. In such aspects, the indicator may be implicitly indicated via a Msg1 preamble transmission (for example, two-step random access procedure) or a MsgA preamble transmission (for example, four-step random access procedure). In some such aspects, one or more RACH resources, such as a RACH occasion or a subset of preambles, may be associated with different respective multi-slot monitoring configurations of the set of multi-slot monitoring configurations. In such aspects, the UE 120 may indicate the selected multi-slot monitoring configuration based on the RACH resource used for a preamble transmission. The association between each RACH resource and a respective multi-slot monitoring configuration of the set of multi-slot monitoring configurations may be indicated via system information, such as a SIB1, or RRC signaling. In some other aspects, the indicator may be included in a payload of a data message transmitted during a random access procedure. In such aspects, the data message may be a Msg3 physical uplink shared channel (PUSCH) transmission or a MsgA PUSCH transmission.

Furthermore, as shown in FIG. 5, at time t4, the UE 120 may monitor a search space, such as the CSS, for downlink control channel transmission in monitoring occasions configured based on the selected multi-slot monitoring configuration. As described, the monitoring occasions may be in two or more non-consecutive slots. The monitoring occasions configured based on the selected multi-slot monitoring configuration may be specified for an initial access period. In some aspects, when implicitly indicating the selected multi-slot monitoring configuration via a RACH resource, the UE 120 may monitor for a Msg2 PDCCH transmission once every M slots based on the first multi-slot monitoring configuration. That is, during a RAR window, the first multi-slot monitoring configuration may be specified for Type1-PDCCH CSS monitoring. In such aspects, the selected multi-slot monitoring configuration may be specified for other CSSs, such as Type0A-PDCCH CSS monitoring or Type2-PDCCH CSS monitoring. Additionally, in such aspects, the UE 120 may monitor for one or more of a PDCCH transmission scheduling a Msg3 retransmission, a Msg4 PDCCH transmission, or other initial access transmissions. In some such aspects, an offset for an initial monitoring occasion of the monitoring occasions configured based on the selected multi-slot monitoring configuration may be implicitly associated with the RACH resource used for implicitly indicating the selected multi-slot monitoring. In other such aspects, the offset for the initial monitoring occasion may be a random access-radio network temporary identifier (RA-RNTI), a Message B-radio network temporary identifier (MSGB-RNTI) value, or indicated by the base station via system information. The offset indicates a slot for the initial monitoring occasion with respect to a reference time, such as a system frame number. In other aspects, when indicating the selected multi-slot monitoring configuration via a PUSCH payload, the UE 120 may monitor for a Msg4 PDCCH transmission or a MsgB PDCCH transmission once every M slots based on the selected multi-slot monitoring configuration. In some such aspects, the UE 120 may monitor for other PDCCH transmissions subsequent to the Msg4 or MsgB PDCCH transmission based on the selected multi-slot monitoring. In some such aspects, the offset of an initial monitoring occasion may be implicitly determined by a random access channel (RACH) occasion (RO), or an RA-RNTI. In other such aspects, the offset of the initial monitoring occasion may be explicitly indicated by the UE 120 in the PUSCH payload. In yet other such aspects, the offset of the initial monitoring occasion may be indicated by the base station.

In some aspects, at time t5, the base station may transmit control information via one or more downlink control channels based on the selected multi-slot monitoring configuration. At time t6, the UE 120 may receive the control information based on the monitoring. Additionally, in some aspects, at time t7, during initial access, the UE 120 may transmit another indicator (for example, second indicator) identifying another multi-slot monitoring configuration (for example, second multi-slot monitoring configuration). The UE 120 may report the second configuration via UE capability reporting, which may be used by the UE 120 to report one or more of preferred multi-slot configurations. The base station may configure PDCCH monitoring occasions during the connected mode operation based on the one or more of preferred multi-slot configurations.

During initial access, due to a limited system information payload, the set of multi-slot configurations supported by the base station 110 may be limited. In some examples, during the initial access, the base station 110 may be limited to supporting a four-slot configuration and an eight-slot configuration. In such examples, the first multi-slot monitoring configuration indicated by the UE 120 may be either the four-slot configuration or the eight-slot configuration. Additionally, during the connected mode operation, the base station 110 may support two, four, eight, and sixteen slot configurations. In such examples, second multi-slot monitoring configuration indicated by the UE 120 may be one or more of the two, four, eight, and sixteen slot configurations. Therefore, in some examples, the second multi-slot monitoring configuration may be different from the first multi-slot monitoring configuration transmitted.

Figure 6:
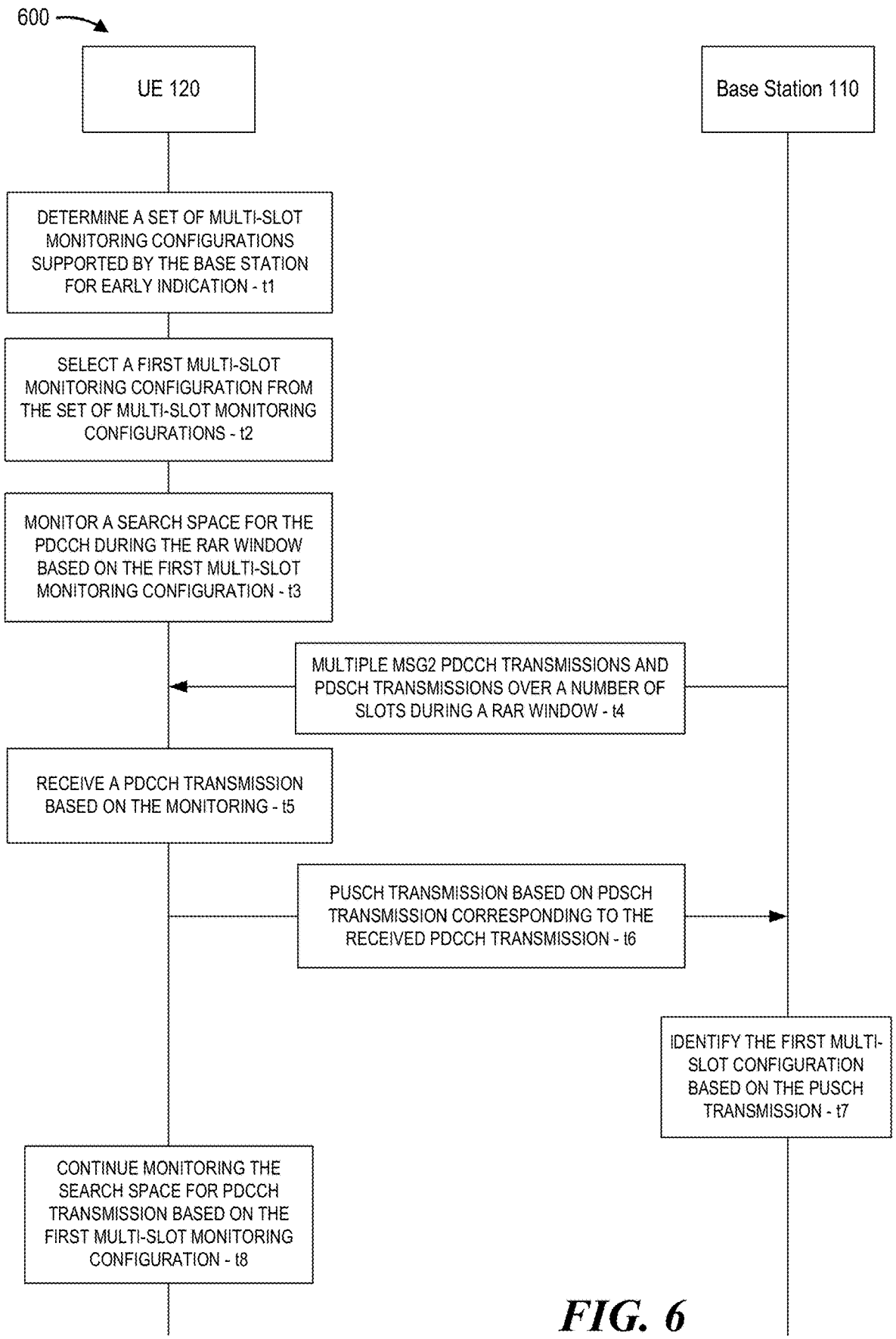
FIG. 6 is a timing diagram illustrating an example of a UE indicating a multi-slot monitoring configuration, in accordance with aspects of the present disclosure.

FIG. 6 is a timing diagram illustrating an example 600 of a UE indicating a multi-slot monitoring configuration, in accordance with aspects of the present disclosure. The example of FIG. 6 may be based on a four-step random access process. As shown in FIG. 6, at time t1, the UE 120 determines a set of multi-slot monitoring configurations supported by the base station 110 for early indication. The set of multi-slot monitoring configurations may be determined based on an implicit indication or an explicit indication, as described with reference to FIG. 5. Each multi-slot monitoring configuration may be associated with a different respective monitoring occasion periodicity for monitoring a PDCCH in a CSS. In the example of FIG. 6, at time t2, the UE 120 may select a first multi-slot monitoring configuration from the set of multi-slot monitoring configurations determined at time t1.

As shown in FIG. 6, at time t3, the UE 120 may monitor a search space for the PDCCH during the RAR window based on the first multi-slot monitoring configuration. That is, the UE 120 may monitor the search space, such as the CSS or the USS, once every M slots, where M may be based on the first multi-slot monitoring configuration. In some examples, if the base station 110 supports both a two-slot multi-slot monitoring configuration and a four-slot multi-slot monitoring configuration, a value of M may be equal to two or four. In some aspects, at time t4, the base station performs multiple Msg2 PDCCH transmissions and PDSCH transmissions over a number of slots (for example, N slots) during a RAR window. The number of slots N may be determined based on $$\max_i \{M_i\} - 1,$$

where $M_i$ represents one or more multi-slot monitoring configurations supported by the base station 110. In one such example, if the base station 110 supports both a two-slot multi-slot monitoring configuration and a four-slot multi-slot monitoring configuration, $M_i$ equals two and four, such that $N = \max\{2, 4\} - 1 = 3$. In such aspects, each PDSCH transmission of the multiple PDSCH transmissions corresponds to a single respective PDCCH transmission of the multiple PDCCH transmissions. Additionally, in such aspects, each PDSCH transmission of the multiple PDSCH transmissions includes a different respective PUSCH uplink grant (for example, RAR uplink grant). The PDSCHs may be examples of RARs.

At time t5, the UE 120 may receive a PDCCH transmission based on the monitoring. At time t6, the UE 120 may perform a PUSCH transmission (for example, a Msg3 PUSCH transmission) based on the PUSCH grant included in the PDSCH transmission corresponding to the PDCCH transmission received at time t5. In some aspects, at time t7, the base station 110 identifies the first multi-slot monitoring configuration selected by the UE 120 based on a PUSCH resource (for example, Msg3 resource) of the PUSCH transmission received at time t6.

In such aspects, at time t8, the UE 120 may continue monitoring the search space for a PDCCH transmission based on the first multi-slot monitoring configuration. In some examples, the UE 120 may monitor for a Msg4 PDCCH transmission or a MsgB PDCCH transmission once every M slots based on the first multi-slot monitoring configuration. In some such aspects, the UE 120 may monitor for other PDCCH transmissions subsequent to the Msg4 or MsgB PDCCH transmission based on the first multi-slot monitoring. In some such aspects, the offset of an initial monitoring occasion may be implicitly determined by a RO or an RA-RNTI. In other such aspects, the offset of the initial monitoring occasion may be explicitly indicated by the UE 120 in the PUSCH payload. In yet other such aspects, the offset of the initial monitoring occasion may be indicated by the base station 110.

Figure 7A:
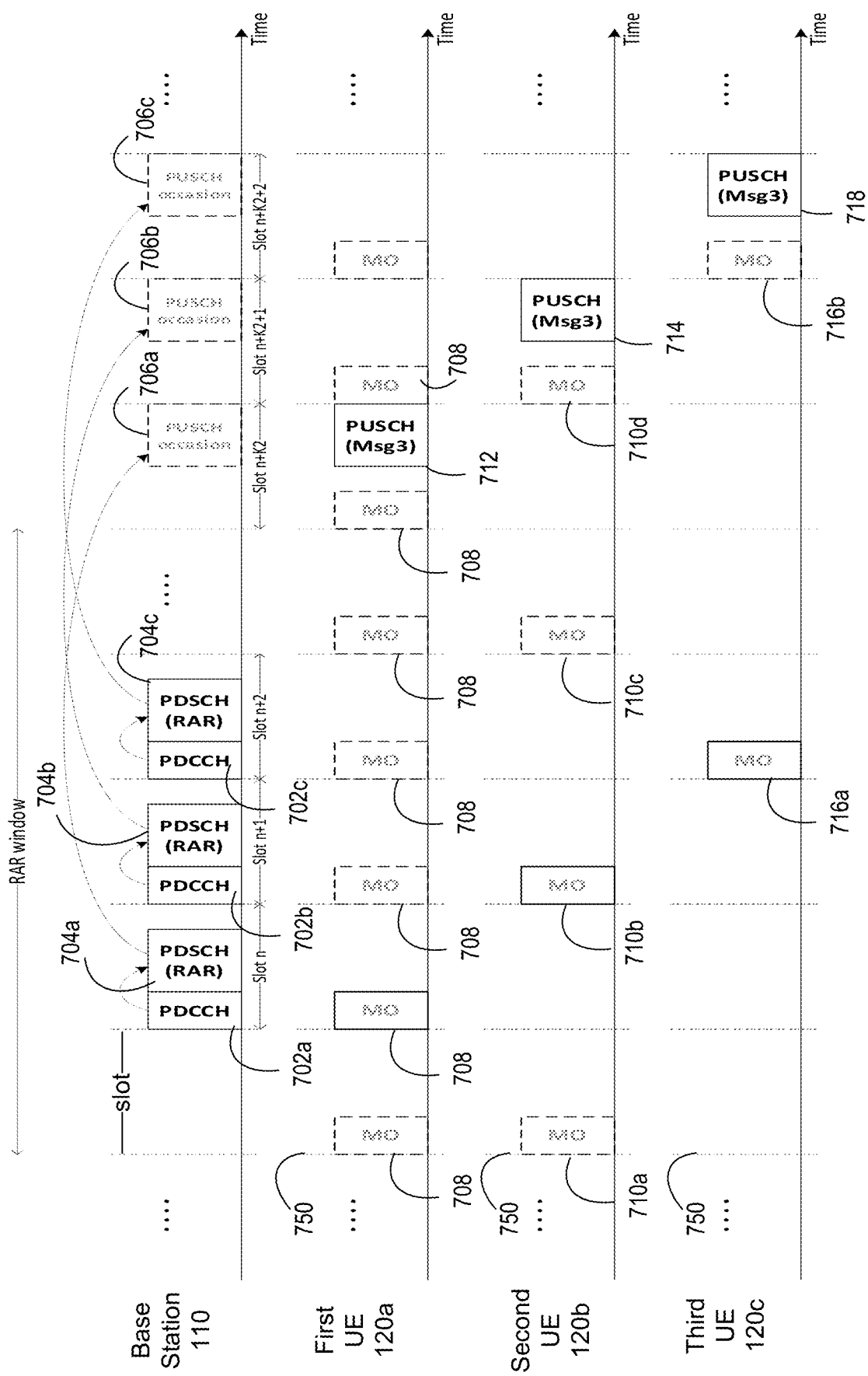
FIG. 7A is a timing diagram illustrating an example of transmitting multiple downlink transmissions over a number of slots during a random access response (RAR) window, in accordance with aspects of the present disclosure.

FIG. 7A is a timing diagram illustrating an example 700 of transmitting multiple downlink transmissions over a number of slots during a RAR window, in accordance with aspects of the present disclosure. In the example of FIG. 7A, each UE 120 may be an example of the UE 120 and the base station 110 may be an example of the base station 110, as described with reference to FIG. 1. As shown in FIG. 7A, during a RAR window, the base station 110 transmits multiple PDCCHs 702a, 702b, and 702c and PDSCHs 704a, 704b, and 704c over a number of slots (for example, N slots) during the RAR window. As described with reference to FIG. 6, the number of slots N may be determined based on $$\max_i \{M_i\} - 1,$$

where $M_i$ represents one or more multi-slot monitoring configurations supported by the base station 110.

In such aspects, each PDSCH 704a, 704b, and 704c corresponds to a single respective PDCCH 702a, 702b, and 702c. In the example of FIG. 7A, a first downlink set (for example, a first PDCCH 702a and a first PDSCH 704a) may be transmitted at slot n, a second downlink transmission set may be transmitted at slot n+1, and a third downlink transmission set may be transmitted at slot n+2. Additionally, in such aspects, each PDSCH 704a, 704b, and 704c includes a different respective PUSCH uplink grant 706a, 706b, and 706c (for example, RAR uplink grant). In the example of FIG. 7A, the first PDSCH 704a includes a first PUSCH uplink grant 706a for an uplink transmission (for example, Msg3 PUSCH) at slot n+K2, the second PDSCH 704b includes a second PUSCH uplink grant 706b for an uplink transmission at slot n+K2+1, and the third PDCCH 704c includes a third PUSCH uplink grant 706c for an uplink transmission at slot n+K2+2.

In the example of FIG. 7A, a first UE 120a may be configured with per-slot PDCCH monitoring. That is, for the first UE 120a, a monitoring occasion 708 may be configured for each slot of a number of consecutive slots. In such an example, the first UE 120a may receive the first PDCCH 702a at slot n because a monitoring occasion 708 of the first UE 120a corresponds with a transmission of the first PDCCH 702a. Additionally, the first UE 120a may perform a PUSCH transmission 712 at slot n+K2 based on the first PUSCH uplink grant 706a included in the first PDSCH 704a. Finally, for the first UE 120a, an offset for an initial monitoring occasion 708 may be zero as there are zero slots between the initial monitoring occasion 708 and a reference time 750. In some examples, the reference time 750 may be a system frame number (SFN).

Additionally, in the example of FIG. 7A, a second UE 120b may be configured with multi-slot PDCCH monitoring, such that monitoring occasions 710a, 710b, 710c, and 710d of the second UE 120b may be configured for non-contiguous slots. In the example of FIG. 7A, the monitoring occasions 710a, 710b, 710c, and 710d of the second UE may occur once every two slots. In such an example, the second UE may receive the second PDCCH 702b at slot n+1 because a second monitoring occasion 710b corresponds with a transmission of the second PDCCH 702b. Additionally, the second UE 120b may perform a PUSCH transmission 714 at slot n+K2+1 based on the second PUSCH uplink grant 706b included in the second PDSCH 704b. Finally, for the second UE 120b, on offset for an initial monitoring occasion 710a may be zero as there are zero slots between the initial monitoring occasion 710a and the reference time 750.

Furthermore, in the example of FIG. 7A, a third UE 120c may be configured with multi-slot PDCCH monitoring, such that monitoring occasions 716a and 716b of the third UE 120c may be configured for non-contiguous slots. In the example of FIG. 7A, the monitoring occasions 716a and 716b of the third UE 120c may occur once every four slots. In such an example, the third UE 120c may receive the third PDCCH 702c at slot n+2 because a monitoring occasion 716a corresponds with a transmission of the third PDCCH 702c. Additionally, the third UE 120c may perform a PUSCH transmission 718 at slot n+K2+2 based on the third PUSCH uplink grant 706c included in the third PDSCH 704c. Finally, for the third UE 120c, on offset for an initial monitoring occasion 716a may be three as there are three slots between the initial monitoring occasion 716a and the reference time 750.

Figure 7B:
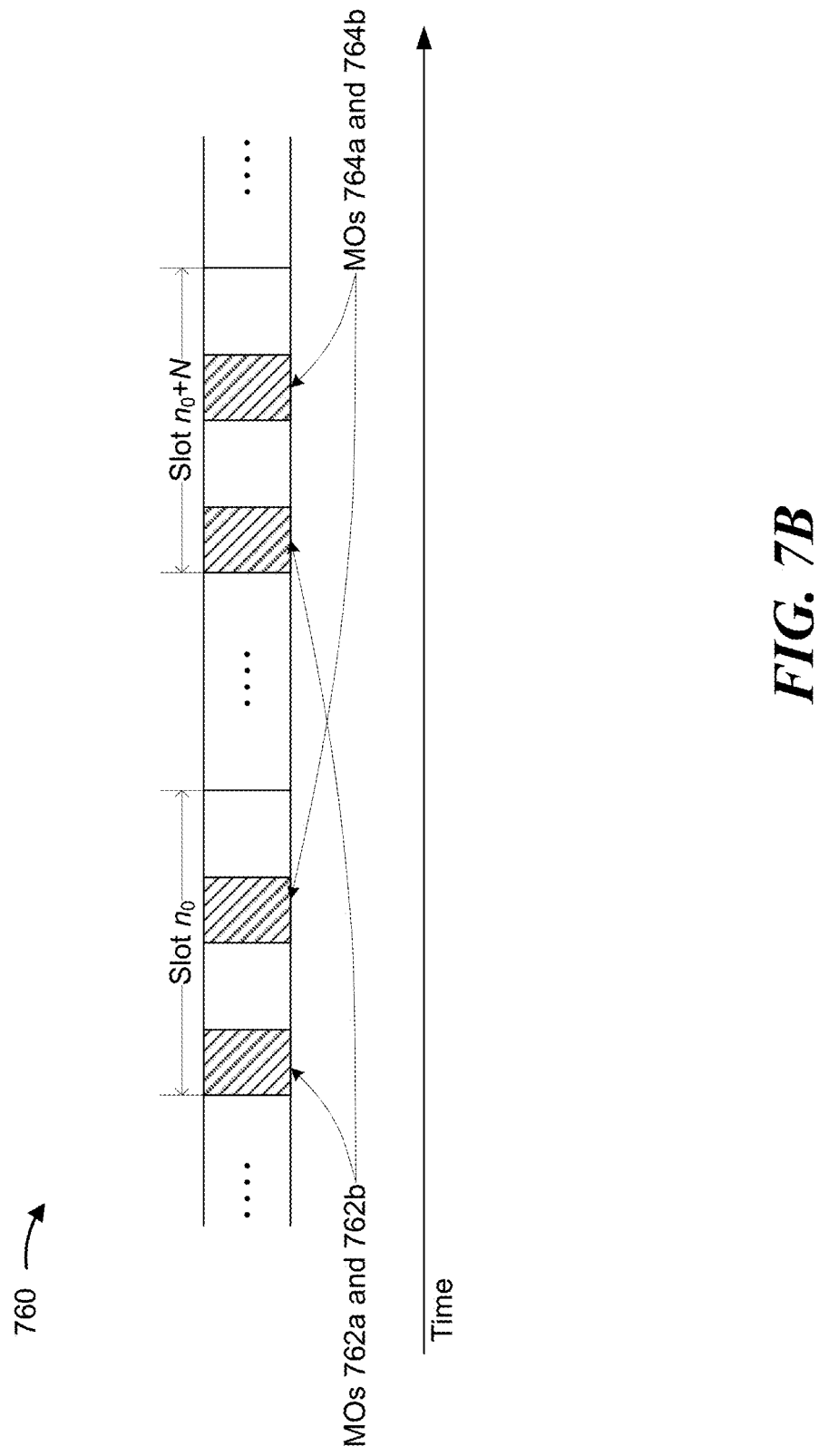
FIG. 7B is a diagram illustrating an example associated with monitoring non-consecutive slots, in accordance with aspects of the present disclosure.

FIG. 7B is a diagram illustrating an example 760 associated with monitoring non-consecutive slots, in accordance with the present disclosure. In the example 760 of FIG. 7B, a base station 110 may transmit, and a UE 120 may receive, a broadcast message (for example, a master information block (MIB) message) that includes a configuration (for example, a pdcch-ConfigSIB1 data structure as defined in 3GPP specifications and/or another standard) associated with a set of monitoring occasions for an additional message (for example, for scheduling information associated with a SIB message).

In some aspects, one or more bits of the broadcast message may indicate that the UE 120 should use monitoring occasions in non-consecutive slots to receive the additional message. For example, pdcch-ConfigSIB1 or another similar data structure may include an additional bit that, when set to '1' or 'TRUE,' instructs the UE 120 to use monitoring occasions in non-consecutive slots. Additionally, or alternatively, the broadcast message may include a separate bit (for example, monitoringConfig or another variable, defined in 3GPP specifications and/or another standard) that instructs the UE 120 to use monitoring occasions in non-consecutive slots.

Additionally, or alternatively, the UE 120 may use one or more properties associated with and/or indicated in the broadcast message to determine to use monitoring occasions in non-consecutive slots. For example, 3GPP specifications and/or another standard may define a rule that uses one or more of an SCS (for example, associated with an SSB and indicated in subCarrierSpacingCommon as defined in 3GPP specifications and/or another standard, and/or associated with a PDCCH and indicated in pdcch-ConfigSIB1 as defined in 3GPP specifications and/or another standard), a frequency (for example, a frequency band in which the SSB was transmitted), and/or a bandwidth (for example, a minimum transmission bandwidth and/or a maximum transmission bandwidth as defined in 3GPP Technical Specification (TS) 38.101-1 and/or another standard), that the UE 120 may use to determine whether to use monitoring occasions in non-consecutive slots. One example is shown in Table 1 below, where "legacy" refers to monitoring occasions that include consecutive slots:

TABLE 1

| SSB SCS (kHz) | PDCCH SCS (kHz) | Frequency | Bandwidth (MHz) | Legacy? |
|---|---|---|---|---|
| 120 | 60 | FR1 | 40 | Yes |
| 120 | 120 | FR2 | 40 | Yes |
| 240 | 120 | FR2 | 40 | Yes |
| 240 | 240 | FR2 | 40 | Yes |
| 240 | 240 | FR4 (for example, 52.6 GHz to 71 GHz) | 80 | No |
| 240 | 240 | FR5 (for example, 95 GHz to 325 GHz) | 80 | No |
| 960 | 240 | FR4 | 320 | Yes |
| 960 | 240 | FR5 | 320 | No |
| 960 | 960 | FR4 | 320 | No |
| 960 | 960 | FR5 | 320 | No |
| 1920 | 960 | FR4 | 640 | No |
| 1920 | 960 | FR5 | 640 | No |
| 1920 | 1920 | FR4 | 640 | No |
| 1920 | 1920 | FR5 | 640 | No |

In some aspects, the broadcast message may indicate a periodicity (for example, represented by M) and an offset (for example, represented by O) associated with the set of monitoring occasions. For example, the broadcast message may include one or more bits (for example, four least significant bits (LSBs)) that encode an index associated with a table (for example, included in 3GPP TS 38.213 and/or another standard), where the table indicates the periodicity and the offset.

Accordingly, the UE 120 may monitor the set of monitoring occasions beginning at an initial slot (for example, represented by $n_0$ in the example 760 of FIG. 7B) based at least in part on a quantity of slots per radio frame (for example, represented by $N_{slot}^{frame}$) and an SSB index (for example, represented by i). In some aspects, the UE 120 may determine the initial slot $n_0$ based at least in part on Equation 1 below $$n_0 = (O \cdot 2^\mu + \lfloor i \cdot M \rfloor) \bmod N_{slot}^{frame}, \quad (1)$$

where $\mu$ is based at least in part on $N_{slot}^{frame}$. For example, $\mu$ may be based at least in part on a table (for example, Table 4.3.2-1 in 3GPP TS 38.211 and/or another standard), an example of which is shown below:

TABLE 2

| $\mu$ | Symbols per slot ($N_{symb}^{slot}$) | Slots per frame ($N_{slot}^{frame}$) | Slots per subframe ($N_{slot}^{subframe}$) |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Additionally, as shown in FIG. 7B, the set of monitoring occasions may be included in a pattern of non-consecutive slots (for example, an initial slot $n_0$ and a non-consecutive slot $n_0$+N) that repeats according to periodicity M. In the example 760 of FIG. 7B, MOs 762*a* and 762*b* are included in non-consecutive slots $n_0$ and $n_0$+N and associated with a pattern that repeats according to periodicity M. Additionally, in the example 760 of FIG. 7B, MOs 764*a* and 764*b* are also included in non-consecutive slots $n_0$ and $n_0$+N and associated with a pattern that repeats according to periodicity M. As described above, the periodicity M may be determined using a table (for example, included in 3GPP TS 38.213 and/or another standard) based at least in part on an index included in the broadcast message. In some aspects, the table may include an extension of Table 13-11 or Table 13-12 in TS 38.213 and/or another standard, such as the example shown below:

TABLE 3

| Index | O | Search spaces per slot | M | First symbol index |
|---|---|---|---|---|
| 16 | 0 | 1 | 4 | 0 |
| 17 | 0 | 2 | 2 | {0 when i is even, 7 when i is odd} |
| 18 | 2.5 | 1 | 4 | 0 |
| 19 | 2.5 | 2 | 2 | {0 when i is even, 7 when i is odd} |
| 20 | 5 | 1 | 4 | 0 |
| 21 | 5 | 1 | 2 | {0 when i is even, 7 when i is odd} |
| 22 | 0 | 2 | 2 | {0 when i is even, 7 when i is odd} |
| 23 | 2.5 | 2 | 2 | {0 when i is even, 7 when i is odd} |
| 24 | 5 | 2 | 2 | {0 when i is even, 7 when i is odd} |
| 25 | 7.5 | 1 | 4 | 0 |
| 26 | 7.5 | 2 | 2 | {0 when i is even, 7 when i is odd} |
| 27 | 7.5 | 2 | 2 | {0 when i is even, 7 when i is odd} |
| 28 | 0 | 1 | 8 | 0 |
| 29 | 5 | 1 | 8 | 0 |
| 30 | | | Reserved | |
| 31 | | | Reserved | |

Accordingly, the base station 110 may use an additional bit in the broadcast message to extend an index associated with the periodicity (for example, represented by M) and the offset (for example, represented by O) from 16 to 32.

As an alternative, the table may include a new table in TS 38.213 and/or another standard, such as the example shown below:

TABLE 4

| Index | O | Search spaces per slot | M | First symbol index |
|---|---|---|---|---|
| 0 | 0 | 1 | 4 | 0 |
| 1 | 0 | 2 | 2 | {0 when i is even, 7 when i is odd} |
| 2 | 2.5 | 1 | 4 | 0 |
| 3 | 2.5 | 2 | 2 | {0 when i is even, 7 when i is odd} |
| 4 | 5 | 1 | 4 | 0 |
| 5 | 5 | 1 | 2 | {0 when i is even, 7 when i is odd} |
| 6 | 0 | 2 | 2 | {0 when i is even, 7 when i is odd} |
| 7 | 2.5 | 2 | 2 | {0 when i is even, 7 when i is odd} |
| 8 | 5 | 2 | 2 | {0 when i is even, 7 when i is odd} |
| 9 | 7.5 | 1 | 4 | 0 |
| 10 | 7.5 | 2 | 2 | {0 when i is even, 7 when i is odd} |
| 11 | 7.5 | 2 | 2 | {0 when i is even, 7 when i is odd} |
| 12 | 0 | 1 | 8 | 0 |
| 13 | 5 | 1 | 8 | 0 |
| 14 | | | Reserved | |
| 15 | | | Reserved | |

Accordingly, the base station 110 may use an additional bit in the broadcast message to instruct the UE 120 to use the new table rather than an existing table (for example, Table 13-11 or Table 13-12 in TS 38.213 and/or another standard). Although the example 760 of FIG. 7B includes two monitoring occasions in one slot (for example, MOs 762*a* and 762*b* are associated with an SSB having an even index, while MOs 764*a* and 764*b* are associated with an SSB having an odd index), other examples include one monitoring occasion in one slot.

In the example 760 of FIG. 7B, N may represent a spacing associated with the pattern. In some aspects, N may be indicated in the broadcast message. For example, N may be equal to periodicity M, where the base station 110 and/or 3GPP specifications select M such that the UE 120 has sufficient processing time for control information transmitted in at least one monitoring occasion of the set of monitoring occasions.

Additionally, or alternatively, N may be selected based at least in part on a quantity of SSB indices (for example, represented by $L_{max}$), a quantity of SSBs per slot (for example, represented by K), or a combination thereof. In some aspects, $L_{max}$ may be preconfigured (for example, according to 3GPP specifications or another standard). As an alternative, the base station 110 may indicate $L_{max}$ to the UE 120 based at least in part on how many SSBs the base station 110 is configured to transmit. Additionally, as described above, K may equal 1 or 2 based at least in part on whether a slot includes two monitoring occasions (for example, associated with two SSBs) or one monitoring occasion (for example, associated with one SSB). In one example, then, the UE 120 may select N based at least in part on $L_{max}$/K such that the base station 110 can transmit control information associated with other SSBs in intervening slots before the UE 120 monitors for control information again. In some aspects, the UE 120 may select N as the maximum of M or $L_{max}/K$. For example, the base station 110 can configure a larger periodicity in some circumstances (for example, by indicating an M larger than $L_{max}/K$ in the broadcast message and/or by selecting an index from a table, as described above, associated with an M larger than $L_{max}/K$).

In some aspects, the base station 110 may multiplex, in frequency and/or space, at least some control information associated with different SSBs in frequency such that the UE 120 may select N smaller than $L_{max}/K$. In one example, the base station 110 may multiplex control information associated with pairs of SSBs such that the UE 120 may select N based at least in part on $L_{max}/2K$. Accordingly, the UE 120 may select N as the maximum of M or $L_{max}/2K$.

By using techniques as described in connection with FIG. 7B, the UE 120 may monitor a set of monitoring occasions that are non-consecutive across slots. For example, the base station 110 may configure the set of monitoring occasions using the broadcast message associated with initial access. Additionally, or alternatively, the UE 120 may determine to use the set of monitoring occasions based on a stored rule (for example, according to 3GPP specifications and/or another standard). As a result, the UE 120 and the base station 110 may experience improved latency and increased quality or reliability of communications because the UE 120 is able to monitor all configured monitoring occasions. Additionally, the UE 120 may conserve power by using micro-sleep in at least a portion of at least some slots.

Figure 7C:
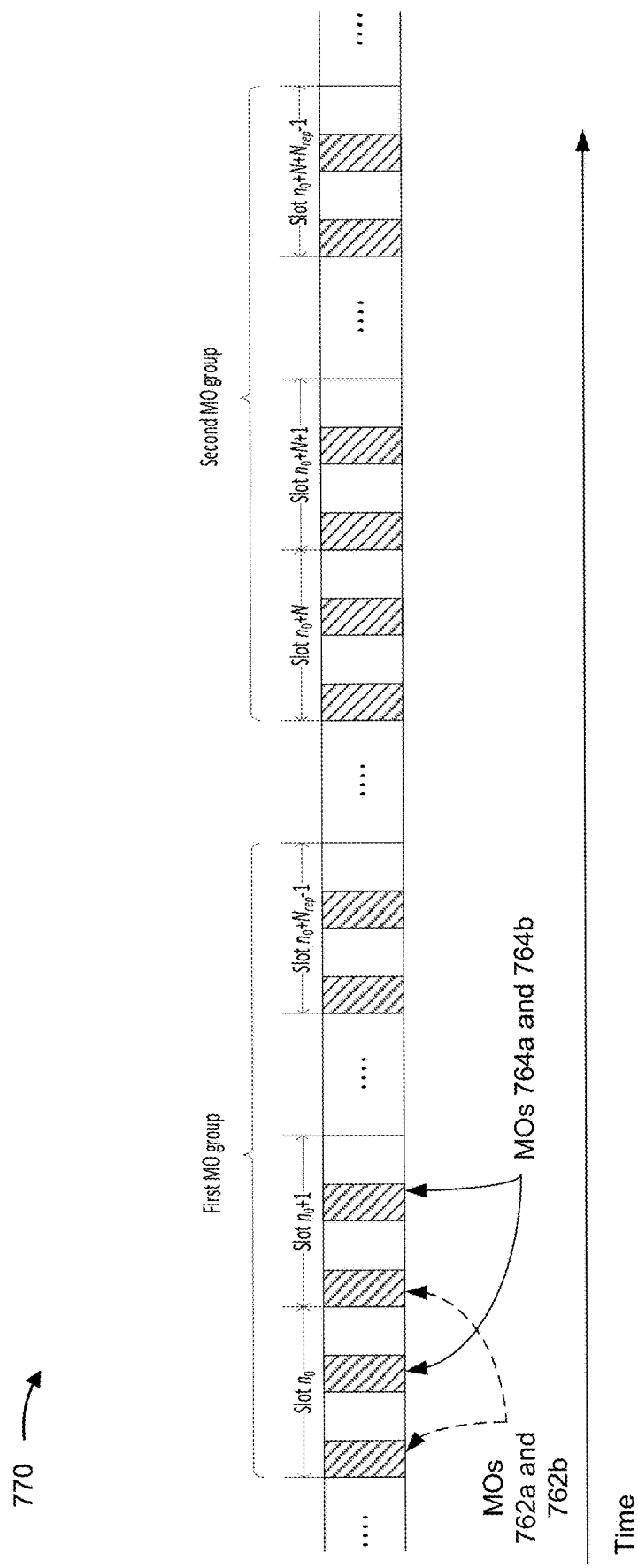
FIG. 7C is a diagram illustrating an example associated with monitoring non-consecutive sets of slots, in accordance with aspects of the present disclosure.

In the example 760 of FIG. 7B, a pattern of non-consecutive slots (for example, the initial slot $n_0$ and the non-consecutive slot $n_0+N$) includes a set of monitoring occasions. In some other examples, a pattern of non-consecutive monitoring occasion groups may be specified. In such examples, each monitoring occasion group from two or more non-consecutive monitoring occasion groups may include consecutive slots. Additionally, in such examples, each monitoring occasion from a set of non-consecutive monitoring occasions may be included in a single slot of the consecutive slots of each monitoring occasion group. A number of slots may be defined between each slot that includes a respective monitoring occasion of the set of non-consecutive monitoring occasions. In some examples, the number of slots between each slot may be two, four, or eight. FIG. 7C is a diagram illustrating an example 770 associated with monitoring non-consecutive sets of slots, in accordance with the present disclosure. In the example 770 of FIG. 7C, a base station 110 may transmit, and a UE 120 may receive, a broadcast message (for example, a MIB message) that includes a configuration (for example, a pdcch-ConfigSIB1 data structure as defined in 3GPP specifications and/or another standard) associated with a set of monitoring occasions for an additional message (for example, for scheduling information associated with a SIB message).

In the example 770 of FIG. 7C, each set of slots may be referred to as an MO group. Each MO group may include multiple consecutive slots. In some examples, as shown in FIG. 7C, a first MO group may include slots $\{n_0, n_0+1, \ldots, n_0+(N_{rep}-1)\}$ and a second MO group may include slots $\{n_0+N, n_0+N\ 1, \ldots, n_0+N+(N_{rep}-1)\}$. In some examples, a UE may monitor one or more slots within each MO group. In the example 770 of FIG. 7C, the slot $n_0$ may represent an initial slot, N may represent a spacing associated with a pattern of non-consecutive MO groups, and $N_{rep}$ may represent a repetition factor for indicating a number of slots in each MO group (for example, the slots of the first MO group of FIG. 7C includes an initial slot $n_0$ to a final slot $n_0+(N_{rep}-1)$). As shown in the example 770 of FIG. 7C, a set of monitoring occasions may be included in consecutive slots (for example, $\{n_0, n_0+1, \ldots, n_0+(N_{rep}-1)\}$) of each MO group. In some such examples, even MOs 762a and 762b are included in consecutive slots $n_0$ and $n_0+N$ of the first MO group. Additionally, as shown in FIG. 7C, odd MOs 764a and 764b are also included in consecutive slots $n_0$ and $n_0+N$ of the first MO group. For ease of explanation, the MOs are identified in FIG. 7C for the first two consecutive slots $n_0$ and $n_0+1$. The MOs are not limited to the first two consecutive slots $n_0$ and $n_0+1$ of the first MO group. The other slots of each MO group also include even and odd MOs.

In some implementations, a broadcast message may indicate the repetition factor $N_{rep}$ and a periodicity M. In some other implementations, the repetition factor $N_{rep}$ may be implicitly determined based on one or more other parameters. Additionally, in some implementations, an index for the initial slot $n_0$ may be determined as:

$$n_0 = \left(O \cdot 2^\mu + \left\lfloor \frac{i}{K} \right\rfloor \cdot N_{rep}\right) \bmod N_{slot}^{frame,\mu}, \qquad (2)$$

where $N_{slot}^{frame}$ may represent a quantity of slots per radio frame, i may represent an SSB index, $\mu$ may be based at least in part on a table 2, and K may represent a quantity of MOs per slot (for example, a quantity of SSBs per slot). For example, as shown in FIG. 7C, an initial slot $n_0$ includes two MOs 762a and 764a and a subsequent slot $n_0+1$ includes two MOs 762b and 764b.

In some examples, such as the example 770 of FIG. 7C, the spacing N may represent a spacing associated with a pattern of non-consecutive MO groups. In some implementations, the spacing N may be indicated in the broadcast message, such as a MIB message. In such implementations, when the periodicity M is indicated in the broadcast message, the spacing N may be based on $$\max\left\{M, \frac{N_{rep} \cdot L_{max}}{K}\right\},$$

where $L_{max}$ represents a maximum quantity of SSB indices. In some other implementations, when the periodicity M is not indicated in the broadcast message, the spacing N may be based on $N_{rep} \cdot L_{max}/K$.

In some implementations, within each MO group, a same PDCCH may be repeated over the consecutive slots (for example, the $N_{rep}$ consecutive slots). In such implementations, the PDCCH may transmit a SIB1 message. In some such examples, each PDCCH transmission in a slot may be associated with a PDSCH transmission in a different slot. In some such examples, each PDCCH and the associated PDSCH transmission may include a same payload and a same resource mapping. In some other examples, each PDCCH and the associated PDSCH transmission may include a same payload and a different resource mapping.

As described, in some examples, a UE may monitor one or more slots within each MO group. In some implementations, when monitoring for a PDCCH transmission within a RAR window, such as the RAR window of FIG. 7A, a UE may monitor a specific slot of multiple slots. In such implementations, the specific slot may correspond to a monitoring slot index determined based on $N_{off}+N \cdot i$, where i is an integer. In some such examples, two or more UEs may share the same RACH resources in a same RAR window. In such examples, each UE may be associated with a different offset $N_{off}$ to reduce control channel resource congestion.

In some implementations, a value of the offset $N_{off}$ may be a random value selected from a set of integers {0, 1, ..., $N_{rep}-1$}, where $N_{rep}$ represents the repetition factor as described above with reference to FIG. 7C. As described above, a base station may repeat the same PDCCH and an associated PDSCH over $N_{rep}$ consecutive slots. Thus, in such implementations, the UE may receive one or more of the PDCCH and associated PDSCH repetitions. In some examples, the associated PDSCH may be an example of a RAR message.

Figure 8:
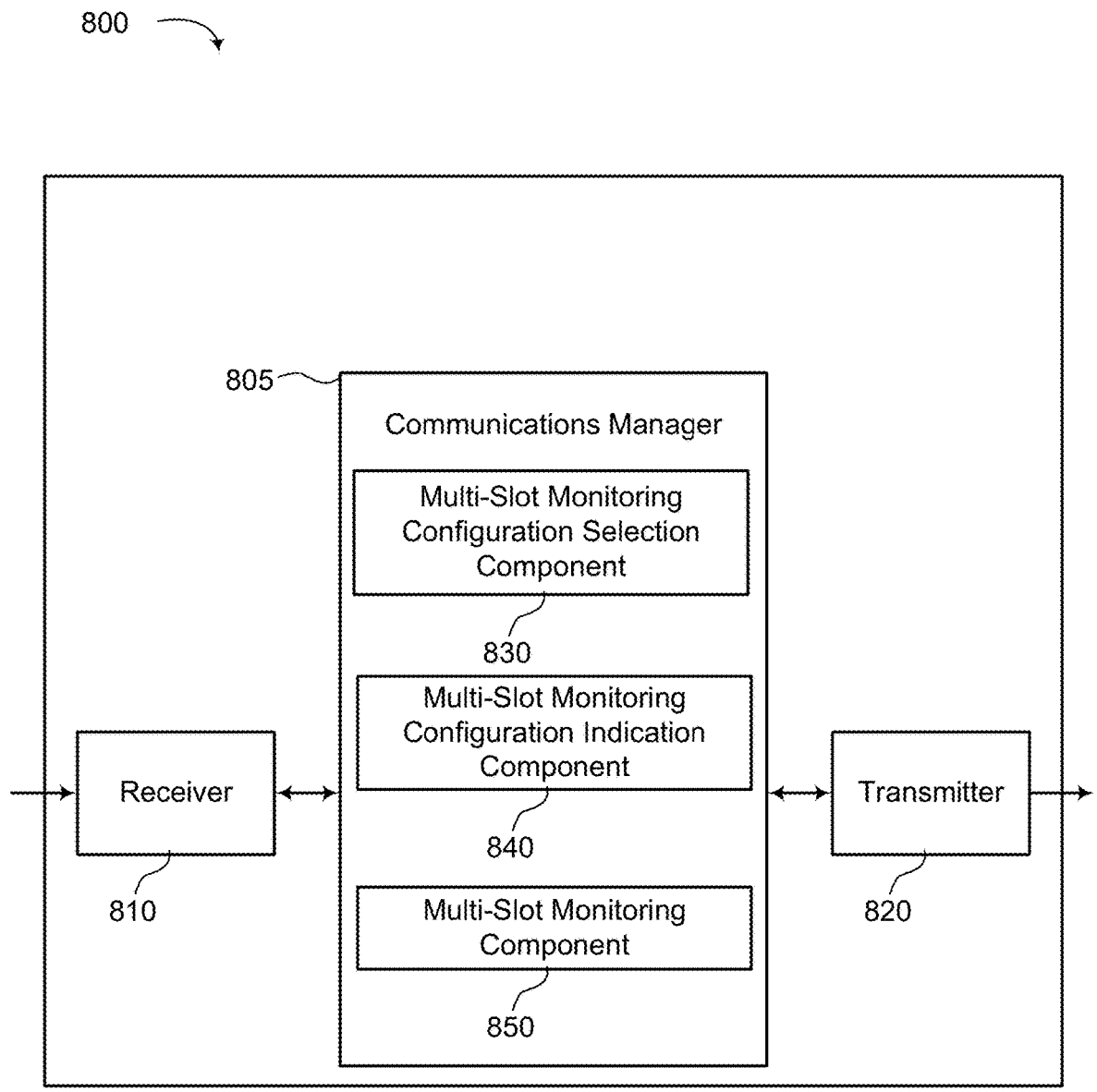
FIG. 8 is a block diagram illustrating an example of a wireless communication device that supports indicating a multi-slot monitoring configuration, in accordance with aspects of the present disclosure.

In other implementations, the UE selects a value of the offset $N_{off}$ as a function of one or more parameters. Such parameters may include, for example, a random access preamble index, an SSB index associated with a current RACH procedure, a time index, a cell index, or other parameters. In some examples, the time index may be an example of a slot index corresponding to one or both of a slot for transmitting a physical random access channel (PRACH) preamble to the base station or a slot for receiving a PDCCH transmission in the RAR window. As an example, if the UE transmits preamble index $k_p$, the offset may be determined as $N_{off}=k_p$ mod N FIG. 8 is a block diagram illustrating an example of a wireless communication device 800 that supports transmitting a communication based on first coherent transmission characteristics or one or more second coherent transmission characteristics, in accordance with aspects of the present disclosure. The device 800 may be an example of aspects of a UE 120 described with reference to FIGS. 1-7. The wireless communication device 800 may include a receiver 810, a communications manager 805, a transmitter 820, a multi-slot monitoring configuration selection component 830, a multi-slot monitoring configuration indication component 840, and a multi-slot monitoring component 850, which may be in communication with one another (for example, via one or more buses). In some examples, the wireless communication device 800 is configured to perform operations, including operations of the process 900 described below with reference to FIG. 9.

In some examples, the wireless communication device 800 can include a chip, chipset, package, or device that includes at least one processor and at least one modem (for example, a 5G modem or other cellular modem). In some examples, the communications manager 805, or its subcomponents, may be separate and distinct components. In some examples, at least some components of the communications manager 805 are implemented at least in part as software stored in a memory. For example, portions of one or more of the components of the communications manager 805 can be implemented as non-transitory code executable by the processor to perform the functions or operations of the respective component.

The receiver 810 may receive one or more of reference signals (for example, periodically configured channel state information reference signals (CSI-RSs), aperiodically configured CSI-RSs, or multi-beam-specific reference signals), synchronization signals (for example, synchronization signal blocks (SSBs)), control information and data information, such as in the form of packets, from one or more other wireless communication devices via various channels including control channels (for example, a PDCCH) and data channels (for example, a PDSCH). The other wireless communication devices may include, but are not limited to, a base station 110 described with reference to FIGS. 1-7.

The received information may be passed on to other components of the device 800. The receiver 810 may be an example of aspects of the receive processor 258 described with reference to FIG. 2. The receiver 810 may include a set of radio frequency (RF) chains that are coupled with or otherwise utilize a set of antennas (for example, the set of antennas may be an example of aspects of the antennas 252a through 252r described with reference to FIG. 2).

The transmitter 820 may transmit signals generated by the communications manager 805 or other components of the wireless communication device 800. In some examples, the transmitter 820 may be collocated with the receiver 810 in a transceiver. The transmitter 820 may be an example of aspects of the transmit processor 284 described with reference to FIG. 2. The transmitter 820 may be coupled with or otherwise utilize a set of antennas (for example, the set of antennas may be an example of aspects of the antennas 252a through 252r described with reference to FIG. 2), which may be antenna elements shared with the receiver 810. In some examples, the transmitter 820 is configured to transmit control information in a physical uplink control channel (PUCCH) and data in a PUSCH.

The communications manager 805 may be an example of aspects of the controller/processor 280 described with reference to FIG. 2. The communications manager 805 may include the multi-slot monitoring configuration selection component 830, the multi-slot monitoring configuration indication component 840, and the multi-slot monitoring component 850. In some implementations, working in conjunction with the receiver 810, the multi-slot monitoring configuration selection component 830 may determine a set of multi-slot monitoring configurations supported by a base station from an implicit indication or explicit indication based on a minimum monitoring occasion periodicity of the UE in a CSS being greater than one slot. Additionally, the multi-slot monitoring configuration selection component 830 may select a first multi-slot monitoring configuration from the set of multi-slot monitoring configurations. In some such implementations, working in conjunction with the transmitter 820, the multi-slot monitoring configuration indication component 840 may transmit, to the base station, a first indicator identifying the first multi-slot monitoring configuration. Additionally, in some such implementation, working in conjunction with the receiver 810, the multi-slot monitoring component 850 may monitor the CSS for a PDCCH in number of non-consecutive monitoring occasion groups, each monitoring occasion group includes a plurality of non-consecutive monitoring occasions based on the first multi-slot monitoring configuration.

Figure 9:
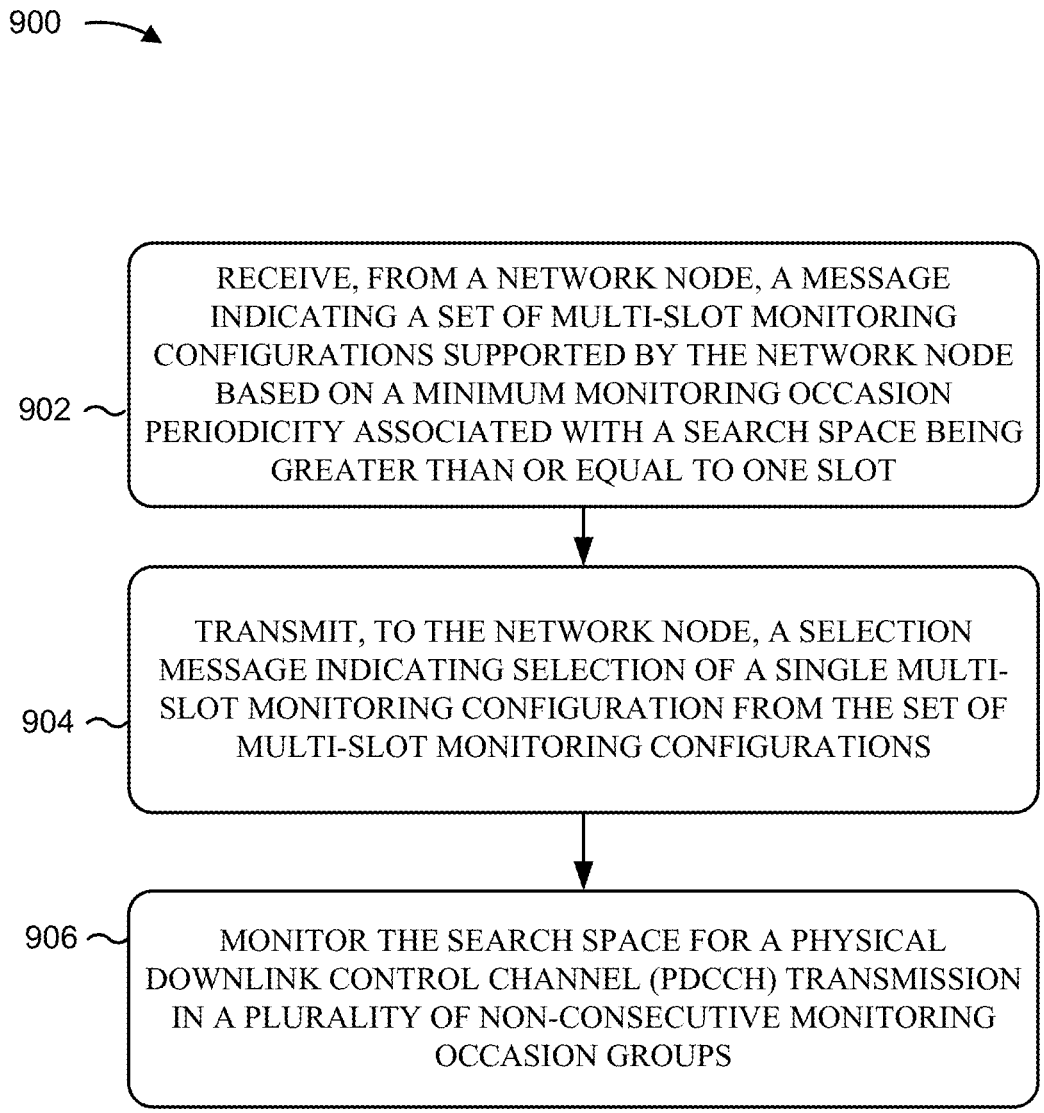
FIG. 9 is a flow diagram illustrating an example process performed, for example, by a receiving device, in accordance with various aspects of the present disclosure.

FIG. 9 is a flow diagram illustrating an example process 900 performed, for example, by a UE 120, in accordance with various aspects of the present disclosure. For example, operations of the process 900 may be performed by a communications manager 805 as described with reference to FIG. 8. In some examples, a UE may execute a set of instructions to control the functional elements of the UE to perform the operations or functions described below. Additionally, or alternatively, a UE may perform aspects of the operations or functions described below using special-purpose hardware.

As shown in FIG. 9, the process 900 begins at block 902 by receiving, from a network node, a message indicating a set of multi-slot monitoring configurations supported by the network node based on a minimum monitoring occasion periodicity associated with a search space being greater than or equal to one slot. At block 904, the process 900 transmits, to the network node, a selection message indicating selection of a single multi-slot monitoring configuration from the set of multi-slot monitoring configurations. At block 906, the process 900 monitors the search space for a PDCCH transmission in a number of non-consecutive monitoring occasion groups. Each monitoring occasion group of the number of non-consecutive monitoring occasion groups may include a number of non-consecutive monitoring occasions associated with the single multi-slot monitoring configuration.

Figure 10:
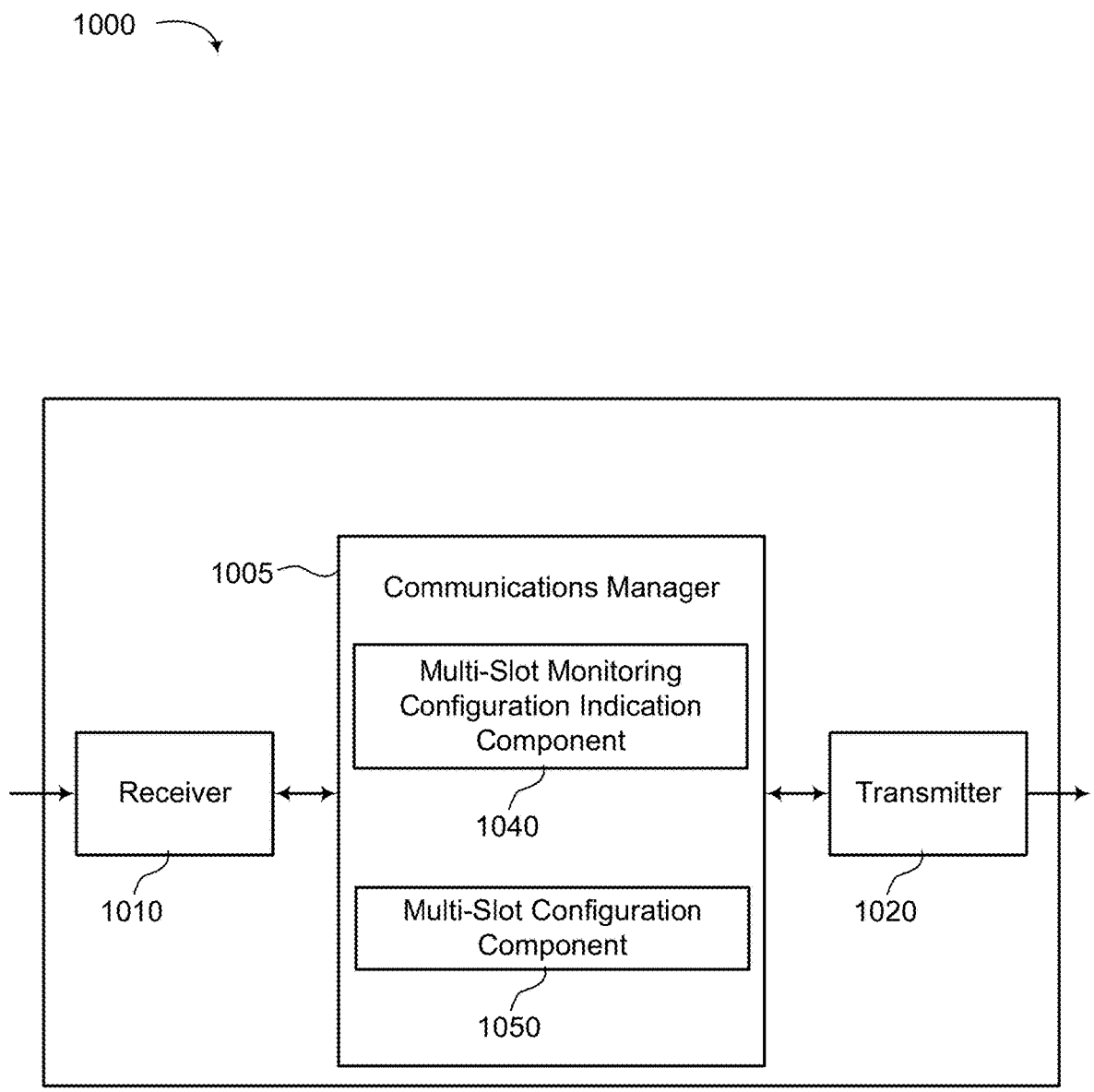
FIG. 10 is a block diagram illustrating an example of a wireless communication device that supports configuring a search space based on a multi-slot monitoring configuration, in accordance with aspects of the present disclosure.

FIG. 10 is a block diagram of a wireless communication device 1000 that supports data-aware precoding, in accordance with various aspects of the present disclosure. The wireless communication device 1000 may be an example of aspects of a base station 110, or its components, as described with reference to FIGS. 1-7. The wireless communication device 1000 may include a receiver 1010, a communications manager 1015, and a transmitter 1020, which may be in communication with one another (for example, via one or more buses). In some examples, the wireless communication device 1000 is configured to perform operations including operations of the process 1100 described below with reference to FIG. 11.

In some examples, the wireless communication device 1000 can include a chip, system-on-a-chip (SoC), chipset, package, or device that includes at least one processor and at least one modem (for example, a 5G modem or other cellular modem). In some examples, the communications manager 1015, or its sub-components, may be separate and distinct components. In some examples, at least some components of the communications manager 1015 are implemented at least in part as software stored in a memory. For example, portions of one or more of the components of the communications manager 1015 can be implemented as non-transitory code executable by the processor to perform the functions or operations of the respective component.

The receiver 1010 may receive one or more of reference signals (for example, periodically configured CSI-RSs, aperiodically configured CSI-RSs, or multi-beam-specific reference signals), synchronization signals (for example, SSBs), control information and data information, such as in the form of packets, from one or more other wireless communication devices via various channels including control channels (for example, a physical downlink control channel (PDCCH)) and data channels (for example, a physical downlink shared channel (PDSCH)). The other wireless communication devices may include, but are not limited to, a UE 120, or its components, as described with reference to FIGS. 1-7.

The received information may be passed on to other components of the device 1000. The receiver 1010 may be an example of aspects of the receive processor 238 described with reference to FIG. 2. The receiver 1010 may include a set of radio frequency (RF) chains that are coupled with or otherwise utilize a set of antennas (for example, the set of antennas may be an example of aspects of the antennas 234a through 234t described with reference to FIG. 2).

The transmitter 1020 may transmit signals generated by the communications manager 1015 or other components of the wireless communication device 1000. The transmitter 1020 may be an example of aspects of the transmit processor 220 described with reference to FIG. 2. The transmitter 1020 may be coupled with or otherwise utilize a set of antennas (for example, the set of antennas may be an example of aspects of the antennas 234a through 234t described with reference to FIG. 2), which may be antenna elements shared with the receiver 1010. In some examples, the transmitter 1020 is configured to transmit random access procedure messages in a PRACH or PUSCH.

The communications manager 1005 may be an example of aspects of the controller/processor 240 described with reference to FIG. 2. The communications manager 1005 may include a multi-slot monitoring configuration indication component 1040 and a multi-slot monitoring configuration component 1050. In some implementations, working in conjunction with the receiver 1010, the multi-slot monitoring configuration indication component 1040 receives, from a UE, a selection message indicating a first multi-slot monitoring configuration selected from a set of multi-slot monitoring configurations supported by the base station based on a minimum monitoring occasion periodicity of the UE in a CSS being greater than one slot. The first multi-slot monitoring configuration identifies a periodicity for monitoring occasions of a plurality of non-consecutive monitoring occasions in each monitoring occasion group of a set of non-consecutive monitoring occasion groups. In some such implementations, working in conjunction with the transmitter 1020, the multi-slot monitoring configuration component 1050 transmits, to the UE, control information on a PDCCH in the CSS based on the first multi-slot monitoring configuration.

Figure 11:
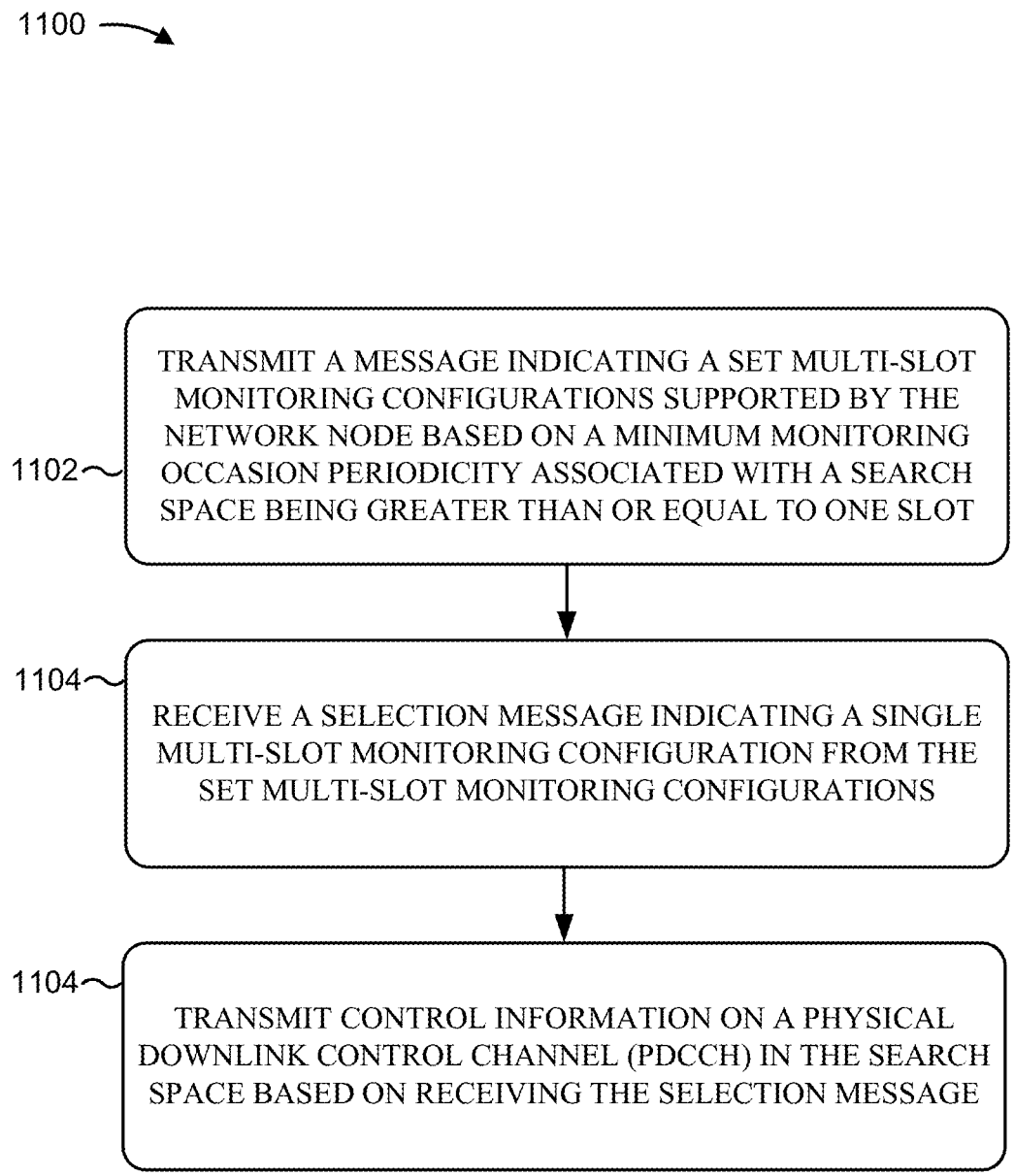
FIG. 11 is a flow diagram illustrating an example process performed, for example, by a transmitting device, in accordance with various aspects of the present disclosure.

FIG. 11 is a flow diagram illustrating an example process 1100 performed at a base station 110 that supports configuring a search space based on a multi-slot monitoring configuration selected by a UE 120, in accordance with various aspects of the present disclosure. The base station 110 is an example of a network entity. The example process 1100 is an example of configuring a search space based on a multi-slot monitoring configuration selected by a UE 120, in accordance with various aspects of the present disclosure. The operations of the process 1100 may be implemented by a base station, such as a base station 110, or its components, described with reference to FIG. 1. For example, operations of the process 1100 may be performed by one or more of the receiver 1010, the communications manager 1005, the transmitter 1020, the multi-slot monitoring configuration indication component 1040, and the multi-slot monitoring configuration component 1050, as described with reference to FIG. 10. In some examples, a base station may execute a set of instructions to control the functional elements of the base station to perform the operations or functions described below. Additionally, or alternatively, a base station may perform aspects of the operations or functions described below using special-purpose hardware.

As shown in FIG. 11, the process 1100 begins at block 1102 by transmitting a message indicating a set multi-slot monitoring configurations supported by the network node based on a minimum monitoring occasion periodicity associated with a search space being greater than or equal to one slot. At block 1104, the process 1100 receives a selection message indicating a single multi-slot monitoring configuration from the set multi-slot monitoring configurations. The single multi-slot monitoring configuration may be associated with a monitoring occasion periodicity for each monitoring occasion group of a number of non-consecutive monitoring occasion groups. Additionally, each monitoring occasion group may include a number of non-consecutive monitoring occasions. At block 1106, the process 1100 transmits control information on a PDCCH in the search space based on receiving the selection message. The control information may be transmitted according to the single multi-slot monitoring configuration.

The following provides an overview of some Aspects of the present disclosure:

Aspect 1. A method for wireless communication performed by a user equipment (UE), comprising: receiving, from a network node, a message indicating a set of multi-slot monitoring configurations supported by the network node based on a minimum monitoring occasion periodicity associated with a search space being greater than or equal to one slot; transmitting, to the network node, a selection message indicating selection of a single multi-slot monitoring configuration from the set of multi-slot monitoring configurations; and monitoring the search space for a physical downlink control channel (PDCCH) transmission in a plurality of non-consecutive monitoring occasion groups, each monitoring occasion group of the plurality of non-consecutive monitoring occasion groups comprising a plurality of non-consecutive monitoring occasions associated with the single multi-slot monitoring configuration.

Aspect 2. The method of Aspect 1, wherein: each monitoring occasion group in the plurality of non-consecutive monitoring occasion groups comprises a plurality of consecutive slots; and each slot of the plurality of consecutive slots comprises one or more monitoring occasions of the plurality of non-consecutive monitoring occasions.

Aspect 3. The method of any one of Aspects 1-2, wherein the PDCCH transmission is repeated in each slot of the plurality of consecutive slots.

Aspect 4. The method of Aspect 3, wherein each PDCCH transmission comprises a same payload and a same resource mapping as each other PDCCH transmission, and each corresponding respective PDSCH transmission comprises a same payload and a same resource mapping as each other PDSCH transmission.

Aspect 5. The method of any one of Aspects 1-4, wherein each PDCCH transmission comprises a same payload and a same resource mapping as each other PDCCH transmission as each other PDCCH transmission, and each corresponding respective PDSCH transmission comprises a same payload and a different resource mapping as each other PDSCH transmission.

Aspect 6. The method of any one of Aspects 1-4, wherein each PDCCH transmission and the corresponding respective PDSCH transmission comprise a same payload and a different resource mapping.

Aspect 7. The method of any one of Aspects 1-2, further comprising receiving, from the network node, a repetition message indicating a repetition factor, wherein a quantity of slots in each monitoring occasion group is based on the repetition factor.

Aspect 8. The method of Aspect 7, further comprising: determining a starting slot index based on the repetition factor and a quantity of monitoring occasions in each slot of the plurality of non-consecutive monitoring occasion groups; and determining a spacing between the plurality of non-consecutive monitoring occasion groups based on the repetition factor, a maximum number of monitoring occasions, and the number of monitoring occasions in each slot.

Aspect 9. The method of any one of Aspects 1-8, wherein each multi-slot monitoring configuration of the set of multi-slot monitoring configurations indicates a periodicity for a set of non-consecutive monitoring occasions associated with the respective multi-slot monitoring configuration.

Aspect 10. The method of any one of Aspects 1-9, wherein the search space is monitored during a random access response (RAR) period.

Aspect 11. A method for wireless communication performed by a network node, comprising: transmitting a message indicating a set multi-slot monitoring configurations supported by the network node based on a minimum monitoring occasion periodicity associated with a search space being greater than or equal to one slot; receiving a selection message indicating a single multi-slot monitoring configuration from the set multi-slot monitoring configurations, the single multi-slot monitoring configuration associated with a monitoring occasion periodicity for each monitoring occasion group of a plurality of non-consecutive monitoring occasion groups, each monitoring occasion group comprising a plurality of non-consecutive monitoring occasions; and transmitting control information on a PDCCH in the search space based on receiving the selection message, the control information being transmitted according to the single multi-slot monitoring configuration.

Aspect 12. The method of Aspect 11, wherein: each monitoring occasion group comprises a plurality of consecutive slots; and each slot of the plurality of consecutive slots comprises one or more monitoring occasions of the plurality of non-consecutive monitoring occasions.

Aspect 13. The method of any one of Aspects 11-12, wherein the PDCCH is transmitted within each slot of the plurality of consecutive slots.

Aspect 14. The method of any one of Aspects 11-13, wherein each PDCCH transmission corresponds to a respective physical downlink shared channel (PDSCH) transmission.

Aspect 15. The method of any one of Aspects 11-14, wherein each PDCCH transmission and the corresponding respective PDSCH transmission comprise a same payload and a same resource mapping.

Aspect 16. The method of any one of Aspects 11-14, wherein each PDCCH transmission and the corresponding respective PDSCH transmission comprise a same payload and a different resource mapping.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and the like.

It will be apparent that systems and/or methods described may be implemented in different forms of hardware, firmware, and a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and methods based, at least in part, on the description.

Even though particular combinations of features are recited in the claims and disclosed in the specification, these combinations are not intended to limit the disclosure of various aspects. In fact, many of these features may be combined in ways not specifically recited in the claims and disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

What is claimed is:

1. A method for wireless communication performed by a user equipment (UE), comprising:
   receiving, from a network node, a message indicating a set of multi-slot monitoring configurations supported by the network node, each multi-slot monitoring configuration of the set of multi-slot monitoring configurations having an associated monitoring occasion periodicity associated with a search space that is greater than or equal to one slot;
   transmitting, to the network node, an indication of a single multi-slot monitoring configuration from the set of multi-slot monitoring configurations; and
   monitoring the search space for a physical downlink control channel (PDCCH) transmission in a plurality of non-consecutive monitoring occasion groups, each monitoring occasion group of the plurality of non-consecutive monitoring occasion groups comprising a plurality of non-consecutive monitoring occasions in a plurality of consecutive slots associated with the single multi-slot monitoring configuration, each slot of the plurality of consecutive slots comprising one or more monitoring occasions of the plurality of non-consecutive monitoring occasions, wherein the PDCCH transmission is repeated in each slot of the plurality of consecutive slots.

2. The method of claim 1, wherein each PDCCH transmission corresponds to a respective physical downlink shared channel (PDSCH) transmission.

3. The method of claim 2, wherein each PDCCH transmission comprises a same payload and a same resource mapping as each other PDCCH transmission, and each corresponding respective PDSCH transmission comprises a same payload and a same resource mapping as each other PDSCH transmission.

4. The method of claim 2, wherein each PDCCH transmission comprises a same payload and a same resource mapping as each other PDCCH transmission as each other PDCCH transmission, and each corresponding respective PDSCH transmission comprises a same payload and a different resource mapping as each other PDSCH transmission.

5. The method of claim 1, further comprising receiving, from the network node, a repetition message indicating a repetition factor,
   wherein a quantity of slots in each monitoring occasion group is based on the repetition factor.

6. The method of claim 5, further comprising:
   determining a starting slot index based on the repetition factor and a quantity of monitoring occasions in each slot of the plurality of non-consecutive monitoring occasion groups; and
   determining a spacing between the plurality of non-consecutive monitoring occasion groups based on the repetition factor, a maximum number of monitoring occasions, and the number of monitoring occasions in each slot.

7. The method of claim 1, wherein each multi-slot monitoring configuration of the set of multi-slot monitoring configurations indicates a periodicity for a set of non-consecutive monitoring occasions associated with the respective multi-slot monitoring configuration.

8. A method for wireless communication performed by a user equipment (UE), comprising:
   receiving, from a network node, a message indicating a set of multi-slot monitoring configurations supported by the network node, each multi-slot monitoring configuration of the set of multi-slot monitoring configurations having an associated monitoring occasion periodicity associated with a search space being that is greater than or equal to one slot;
   transmitting, to the network node, an indication of a single multi-slot monitoring configuration from the set of multi-slot monitoring configurations; and
   monitoring, during a random access response (RAR) period, the search space for a physical downlink control channel (PDCCH) transmission in a plurality of non-consecutive monitoring occasion groups, each monitoring occasion group of the plurality of non-consecutive monitoring occasion groups comprising a plurality of non-consecutive monitoring occasions in one or more slots associated with the single multi-slot monitoring configuration.

9. An apparatus for wireless communication by user equipment (UE), comprising:
   a processor; and
   a memory coupled with the processor and storing instructions operable, when executed by the processor, to cause the apparatus to:

receive, from a network node, a message indicating a set of multi-slot monitoring configurations supported by the network node, each multi-slot monitoring configuration of the set of multi-slot monitoring configurations having an associated monitoring occasion periodicity associated with a search space that is greater than or equal to one slot;

transmit, to the network node, an indication of a single multi-slot monitoring configuration from the set of multi-slot monitoring configurations; and monitor the search space for a physical downlink control channel (PDCCH) transmission in a plurality of non-consecutive monitoring occasion groups, each monitoring occasion group of the plurality of non-consecutive monitoring occasion groups comprising a plurality of non-consecutive monitoring occasions in a plurality of consecutive slots associated with the single multi-slot monitoring configuration, each slot of the plurality of consecutive slots comprising one or more monitoring occasions of the plurality of non-consecutive monitoring occasions, wherein the PDCCH transmission is repeated in each slot of the plurality of consecutive slots.

10. The apparatus of claim 9, wherein each PDCCH transmission corresponds to a respective physical downlink shared channel (PDSCH) transmission.

11. The apparatus of claim 10, wherein each PDCCH transmission comprises a same payload and a same resource mapping as each other PDCCH transmission, and each corresponding respective PDSCH transmission comprises a same payload and a same resource mapping as each other PDSCH transmission.

12. The apparatus of claim 10, wherein each PDCCH transmission comprises a same payload and a same resource mapping as each other PDCCH transmission as each other PDCCH transmission, and each corresponding respective PDSCH transmission comprises a same payload and a different resource mapping as each other PDSCH transmission.

13. The apparatus of claim 9, wherein:
execution of the instructions further cause the apparatus to receive, from the network node, a repetition message indicating a repetition factor; and
a quantity of slots in each monitoring occasion group is based on the repetition factor.

14. An apparatus for wireless communication by user equipment (UE), comprising:
a processor; and
a memory coupled with the processor and storing instructions operable, when executed by the processor, to cause the apparatus to:
receive, from a network node, a message indicating a set of multi-slot monitoring configurations supported by the network node, each multi-slot monitoring configuration of the set of multi-slot monitoring configurations having an associated monitoring occasion periodicity associated with a search space being that is greater than or equal to one slot;
transmit, to the network node, an indication of a single multi-slot monitoring configuration from the set of multi-slot monitoring configurations; and
monitor, during a random access response (RAR) period, the search space for a physical downlink control channel (PDCCH) transmission in a plurality of non-consecutive monitoring occasion groups, each monitoring occasion group of the plurality of non-consecutive monitoring occasion groups comprising a plurality of non-consecutive monitoring occasions in one or more slots associated with the single multi-slot monitoring configuration.

15. A method for wireless communication performed by a network node, comprising:
transmitting a message indicating a set multi-slot monitoring configurations supported by the network node, each multi-slot monitoring configuration of the set of multi-slot monitoring configurations having an associated monitoring occasion periodicity associated with a search space that is greater than or equal to one slot;
receiving an indication of a single multi-slot monitoring configuration from the set multi-slot monitoring configurations, the single multi-slot monitoring configuration associated with a monitoring occasion periodicity for each monitoring occasion group of a plurality of non-consecutive monitoring occasion groups, each monitoring occasion group comprising a plurality of non-consecutive monitoring occasions in a plurality of consecutive slots associated with the single multi-slot monitoring configuration, each slot of the plurality of consecutive slots comprising one or more monitoring occasions of the plurality of non-consecutive monitoring occasions, wherein the PDCCH transmission is repeated in each slot of the plurality of consecutive slots; and
transmitting control information on a physical downlink control channel (PDCCH) in the search space based on receiving the indication of the single multi-slot monitoring configuration, the control information being transmitted according to the single multi-slot monitoring configuration.

16. The method of claim 15, wherein each PDCCH transmission corresponds to a respective physical downlink shared channel (PDSCH) transmission.

17. The method of claim 16, wherein each PDCCH transmission comprises a same payload and a same resource mapping as each other PDCCH transmission, and each corresponding respective PDSCH transmission comprises a same payload and a same resource mapping as each other PDSCH transmission.

18. The method of claim 16, wherein each PDCCH transmission comprises a same payload and a same resource mapping as each other PDCCH transmission as each other PDCCH transmission, and each corresponding respective PDSCH transmission comprises a same payload and a different resource mapping as each other PDSCH transmission.

19. An apparatus for wireless communication by a network node, comprising:
a processor; and
a memory coupled with the processor and storing instructions operable, when executed by the processor, to cause the apparatus to:
transmit a message indicating a set multi-slot monitoring configurations supported by the network node, each multi-slot monitoring configuration of the set of multi-slot monitoring configurations having an associated monitoring occasion periodicity associated with a search space that is greater than or equal to one slot;
receive an indication of a single multi-slot monitoring configuration from the set multi-slot monitoring configurations, the single multi-slot monitoring configuration associated with a monitoring occasion periodicity for each monitoring occasion group of a plurality of non-consecutive monitoring occasion groups, each monitoring occasion group comprising a plurality of non-consecutive monitoring occasions in a plurality of consecutive slots associated with the single multi-slot monitoring configuration, each slot of the plurality of consecutive slots comprising one or more monitoring occasions of the plurality of non-consecutive monitoring occasions, wherein the PDCCH transmission is repeated in each slot of the plurality of consecutive slots; and transmit control information on a physical downlink control channel (PDCCH) in the search space based on receiving the indication of the single multi-slot monitoring configuration, the control information being transmitted according to the single multi-slot monitoring configuration.

20. The apparatus of claim 19, wherein each PDCCH transmission corresponds to a respective physical downlink shared channel (PDSCH) transmission.

21. The apparatus of claim 20, wherein each PDCCH transmission comprises a same payload and a same resource mapping as each other PDCCH transmission, and each corresponding respective PDSCH transmission comprises a same payload and a same resource mapping as each other PDSCH transmission.

22. The apparatus of claim 20, wherein each PDCCH transmission comprises a same payload and a same resource mapping as each other PDCCH transmission as each other PDCCH transmission, and each corresponding respective PDSCH transmission comprises a same payload and a different resource mapping as each other PDSCH transmission.

* * * * *